United States Patent
Borah

(10) Patent No.: US 10,187,249 B2
(45) Date of Patent: Jan. 22, 2019

(54) DISTRIBUTED METRIC DATA TIME ROLLUP IN REAL-TIME

(71) Applicant: AppDynamics LLC, San Francisco, CA (US)

(72) Inventor: Gautam Borah, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 187 days.

(21) Appl. No.: 15/143,112

(22) Filed: Apr. 29, 2016

(65) Prior Publication Data

US 2017/0317874 A1    Nov. 2, 2017

(51) Int. Cl.
```
H04L 12/24      (2006.01)
H04L 12/743     (2013.01)
H04L 12/42      (2006.01)
H04L 12/891     (2013.01)
```

(52) U.S. Cl.
CPC .......... *H04L 41/0668* (2013.01); *H04L 12/42* (2013.01); *H04L 41/5009* (2013.01); *H04L 45/7453* (2013.01); *H04L 47/41* (2013.01); *H04L 41/046* (2013.01)

(58) Field of Classification Search
CPC . H04L 41/0668; H04L 47/41; H04L 45/7453; H04L 12/42
See application file for complete search history.

(56) References Cited

U.S. PATENT DOCUMENTS

| | | | | |
|---|---|---|---|---|
| 2007/0239686 | A1* | 10/2007 | Quinn-Jacobs | G06F 17/245 |
| 2014/0180915 | A1* | 6/2014 | Montulli | H04L 51/08 705/40 |
| 2016/0028630 | A1* | 1/2016 | Wells | H04L 45/7453 370/389 |
| 2016/0088072 | A1* | 3/2016 | Likhtarov | H04L 67/1008 709/226 |
| 2016/0380866 | A1* | 12/2016 | Taylor | H04L 47/783 709/224 |

* cited by examiner

*Primary Examiner* — Christine Ng
(74) *Attorney, Agent, or Firm* — Parker Ibrahim & Berg LLP; James M. Behmke; Stephen D. LeBarron

(57) ABSTRACT

In one aspect, a system for distributed consistent hash backed time rollup of performance metric data is disclosed. The system includes a plurality of collectors configured to receive, time series metrics data for a plurality of performance metrics from one or more agents instrumented into monitored applications; a plurality of aggregators communicatively connected to the collectors and configured to aggregate the received time series metric data for the plurality of performance metrics, wherein each aggregator is assigned to aggregate all received time series metrics data for one or more of the plurality of performance metrics; and a coordinator communicatively connected to the plurality of collectors and plurality of aggregators and configured to provide collectors with information on availability of the plurality of aggregators.

15 Claims, 15 Drawing Sheets

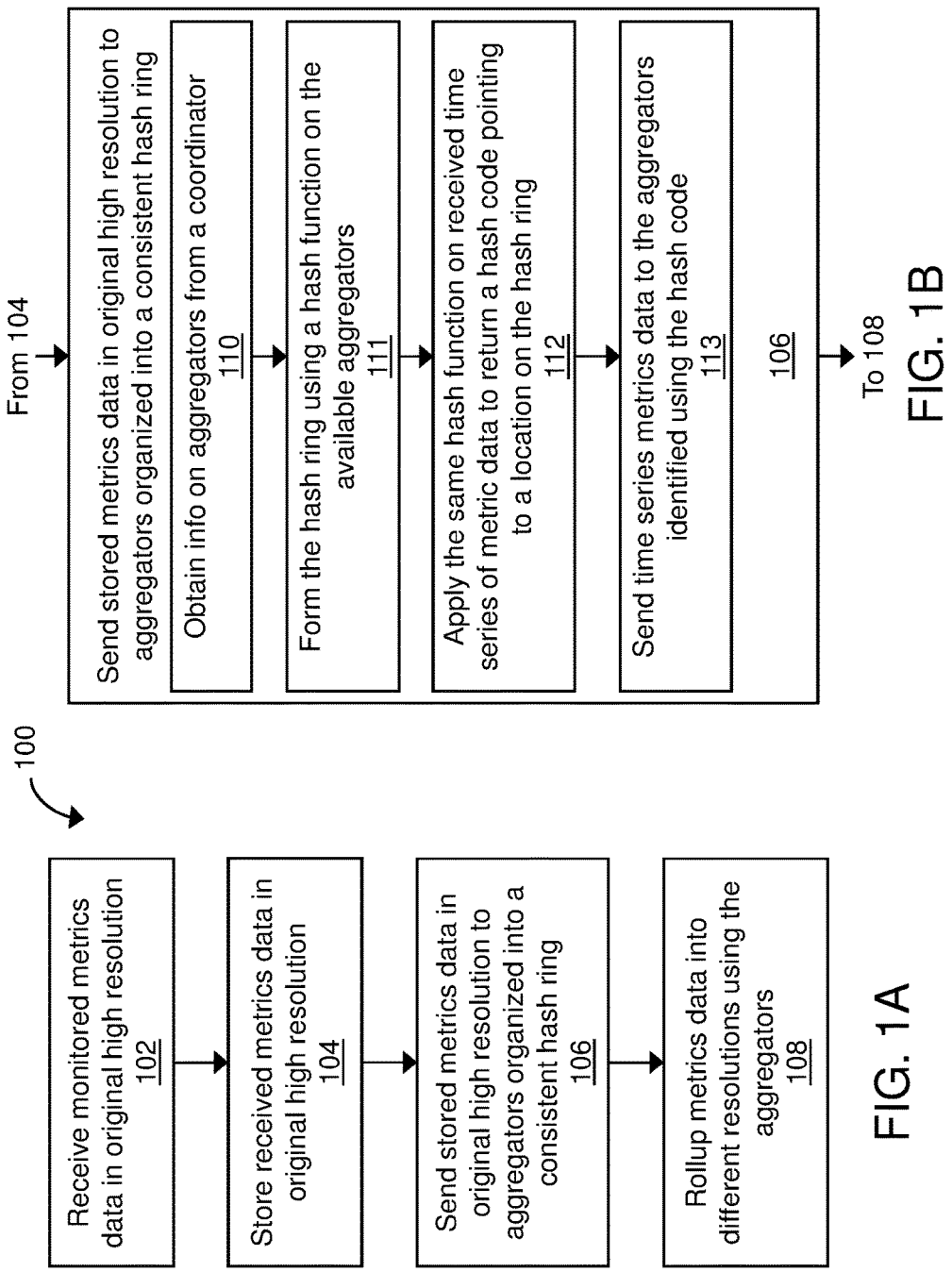

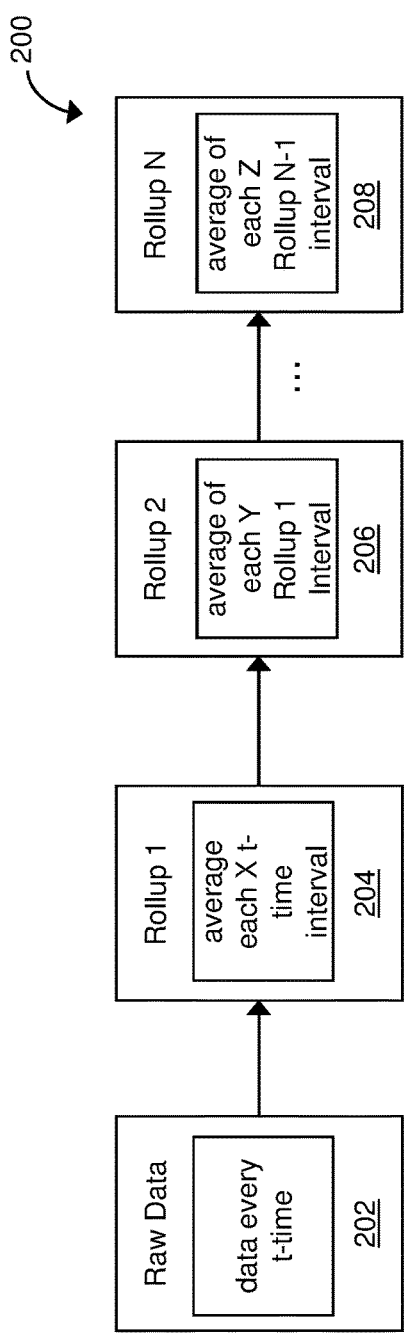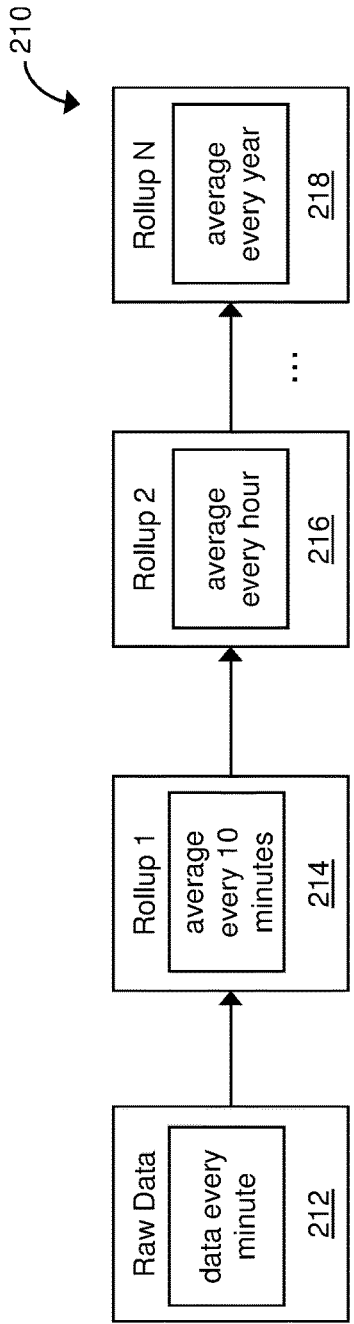
FIG. 2A
FIG. 2B

| Key | Column Family 1 (TTL 24 Hours) | | Column Family 2 (TTL 8 Days) | | Column Family 3 (TTL 1 Year) | |
|---|---|---|---|---|---|---|
| | Col | Value | Col | Value | Col | Value |
| K1 | 00:00 | V1 | 00:00 | V1 | 00:00 | V1 |
| | 00:01 | V2 | 00:10 | V2 | 01:00 | V2 |
| | ... | ... | ... | ... | ... | ... |
| | 11:59 | V720 | 11"50 | V72 | 11:00 | V12 |
| K2 | ... | | ... | | ... | |
| K3 | ... | | ... | | ... | |

[prefix salt] [metric identity] [12 hours time since epoch]

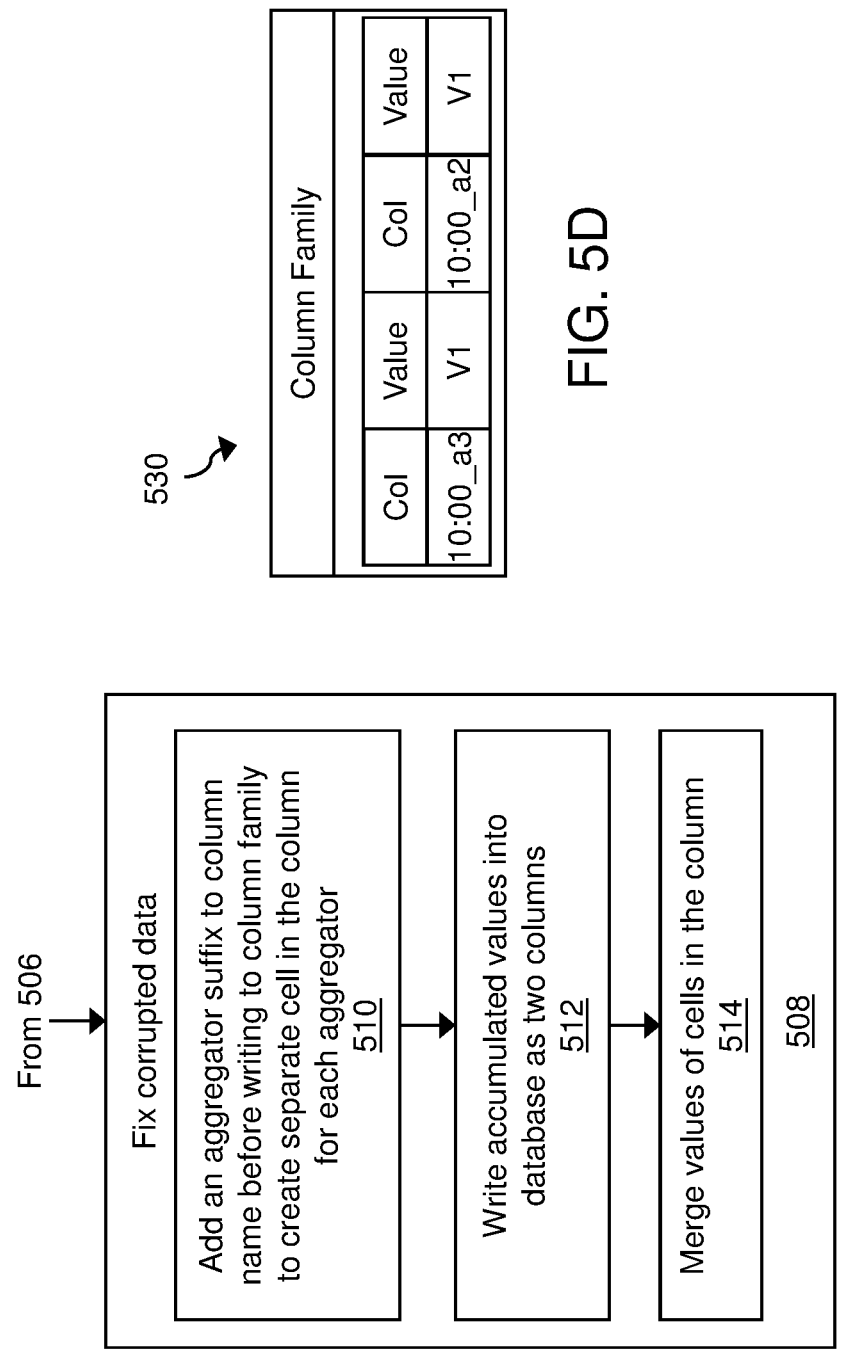

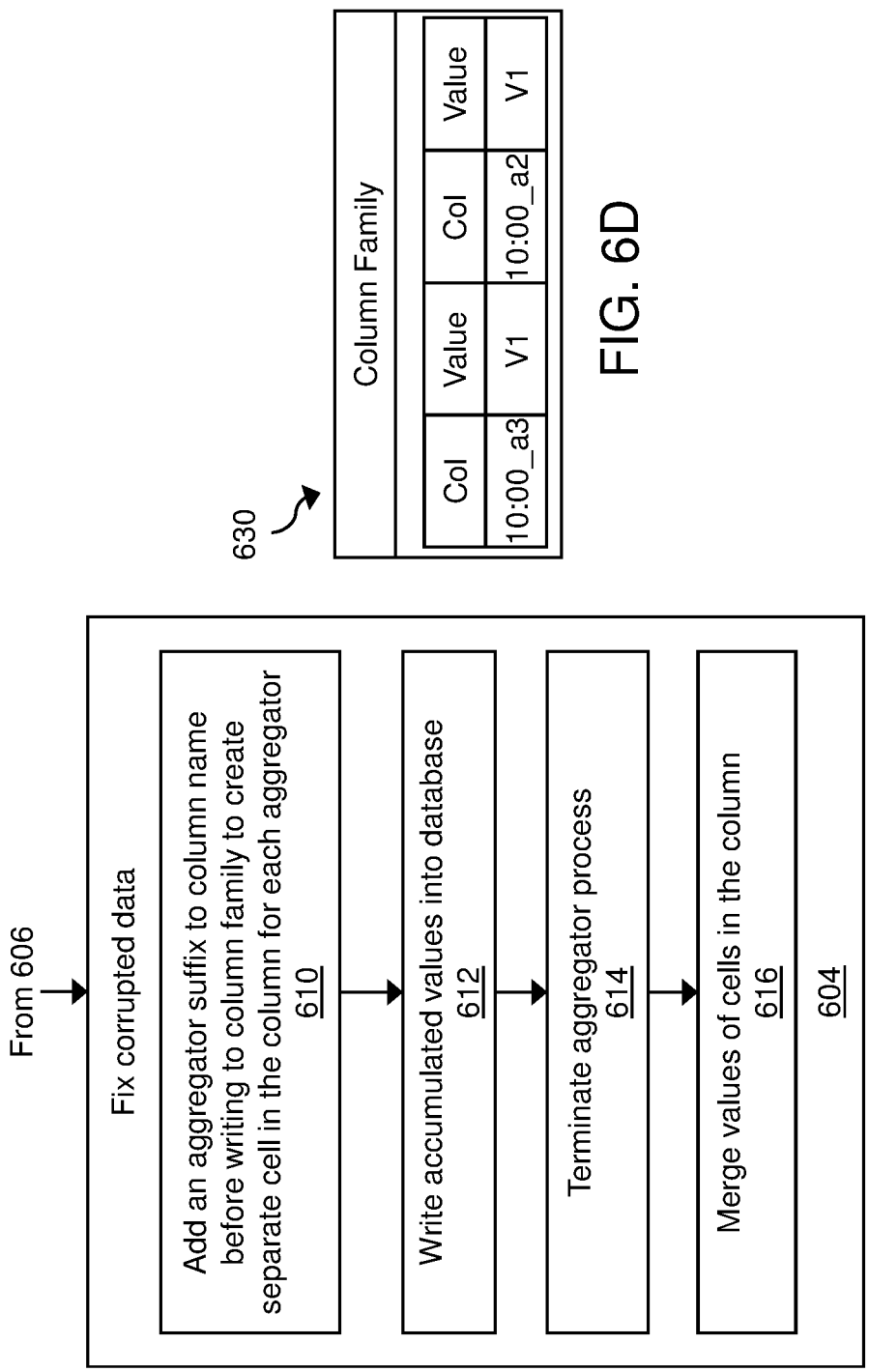

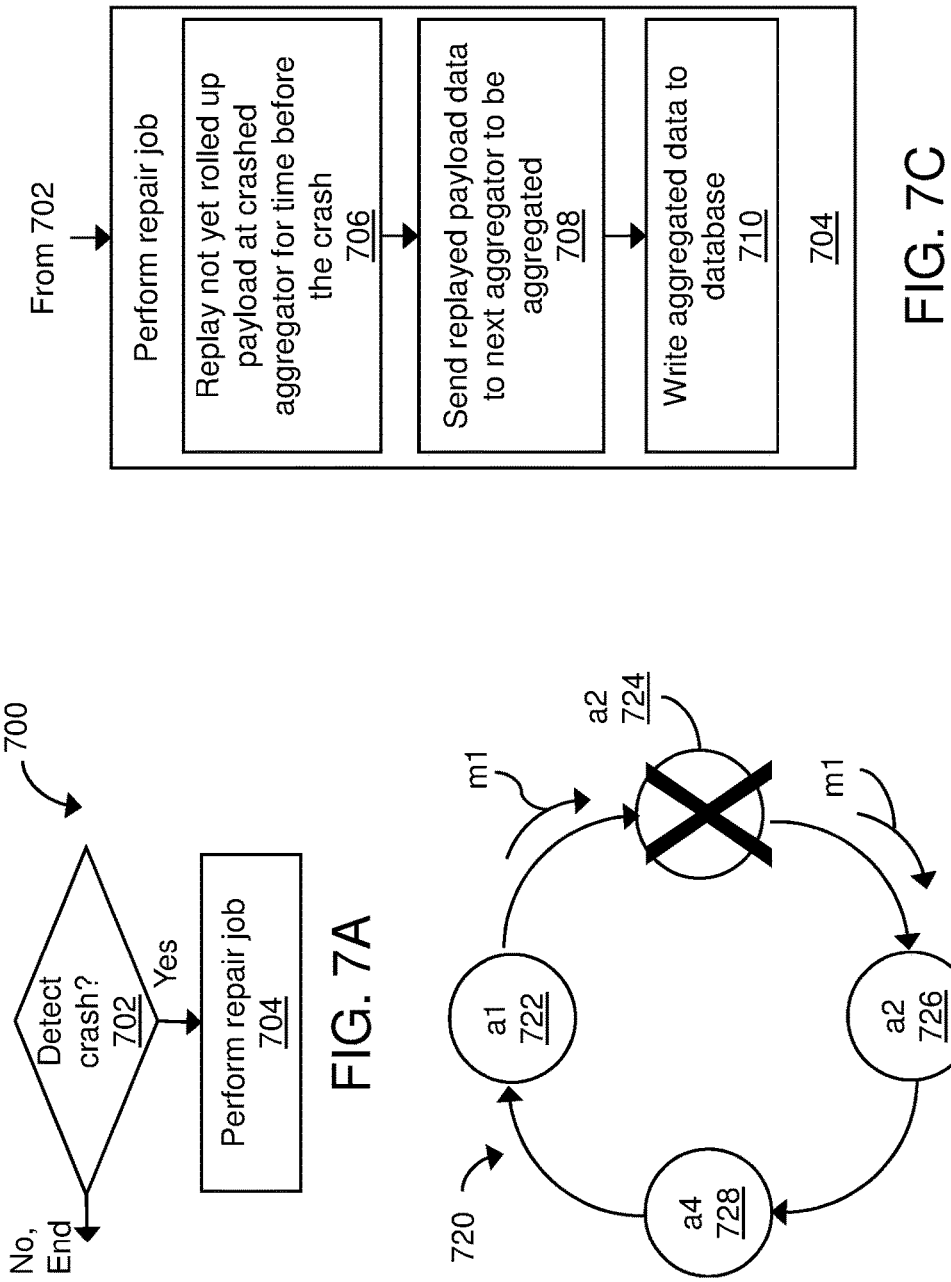

DISTRIBUTED METRIC DATA TIME ROLLUP IN REAL-TIME

BACKGROUND

In pursuit of the highest level of service performance and user experience, companies around the world are engaging in digital transformation by enhancing investments in digital technology and information technology (IT) services. By leveraging the global system of interconnected computer networks afforded by the Internet and the World Wide Web, companies are able to provide ever increasing web services to their clients. The web services may be provided by a web application which uses multiple services and applications to handle a given transaction. The applications may be distributed over several interconnected machines, such as servers, making the topology of the machines that provide the service more difficult to track and monitor.

SUMMARY

Examples of implementations for distributed metric data time rollup in real-time is disclosed. Specifically, the disclosed technology can enable distributed consistent hash backed metric time rollup mechanism in real time using read-time resolution technique, with built in support for partial service failures, with high availability.

In one aspect, a system for distributed consistent hash backed time rollup of performance metric data is disclosed. The system includes a plurality of collectors configured to receive, time series metrics data for a plurality of performance metrics from one or more agents instrumented into monitored applications; a plurality of aggregators communicatively connected to the collectors and configured to aggregate the received time series metric data for the plurality of performance metrics, wherein each aggregator is assigned to aggregate all received time series metrics data for one or more of the plurality of performance metrics; and a quorum based coordinator communicatively connected to the plurality of collectors and plurality of aggregators and configured to provide collectors with information on the plurality of aggregators including assignments of the performance metrics to each aggregator.

The system can be implemented in various ways to include one or more of the following features. For example, the aggregators can be arranged in a consistent hash ring using a hash function. The coordinator can detect whether one of the plurality of aggregators has been removed from the hash ring or whether a new aggregator has been added to the hash ring. Each aggregator can perform time roll up of the received time series metric data for the assigned one or more performance metric. Each aggregator can receive the time series metrics data for the assigned one or more of the plurality of performance metrics from two or more of the plurality of collectors. The coordinator can detect whether one of the plurality of aggregators has been removed from the hash ring. The collectors can be configured to apply the same hash function used to form the hash ring on the received time series metric data for a given performance metric to generate a hash code that points to a location on the hash ring, so that one of the aggregators closest to the hash code on the hash ring is assigned to process all of the received time series metric data for the given performance metric. The collectors can be configured to use the hash code to route the received time series metric data for each performance metric to corresponding aggregator node on the consistent hash ring. The coordinator can include a quorum based coordinator service that provides information to the plurality of collectors about the information on all of the aggregators that are available to form the consistent hash ring. For example, when there are 10 collectors and 5 aggregators in the system, all 10 collectors will get the same list of aggregators from the quorum based coordinator. The collectors will form the same consistent hash ring by using the same hash function on the aggregators (host and port info). When the time series metric data for a given metric arrives at a collector, the collector applies the same hash function and routes the time series metric data to the aggregator identified based on the hash function. Because the hash function is same for all 10 collectors, when the time series metric data for the given metric arrives at different collectors for each minute in a 10 minute window, all of the time series metric data for the given metric will be routed to a single aggregator as long as the aggregator is available for processing.

The collectors can be totally stateless allowing for arbitrarily adding or removing of collectors to the metric processing system to collect metrics from agents, depending on the load on the system. Thus, the metric processing system is scalable. Arranging the aggregators in a consistent hash ring can allow the collectors to route every metrics to the appropriate aggregator for all reported times. This arrangement can allow aggregators to roll up or aggregate metrics in various configured rollup intervals.

In another aspect, a method for distributed consistent hash backed time rollup of performance metric data is disclosed. The method includes receiving, at a plurality of collectors, time series metrics data for a plurality of performance metrics from one or more agents instrumented into monitored applications; aggregating, at a plurality of aggregators communicatively connected to the collectors to form a hash ring, the received time series metrics data for the plurality of performance metrics, wherein each aggregator is assigned to aggregate all received time series metrics data for one or more of the plurality of performance metrics; determining, at a coordinator communicatively connected to the plurality of collectors and the plurality of aggregators, whether the hash ring has changed; and communicating, at the coordinator, information on the determined change to the plurality of collectors.

The method can be implemented in various ways to include one or more of the following features. For example, the information can indicate that one of the plurality of aggregators has been removed or a new aggregator has been added. The method can include redistributing, by the collectors, the received time series metrics data based on the information. The redistributing can include forwarding the received time series metrics data for the one or more of the plurality of performance metrics assigned to the removed aggregator to next aggregator in the hash ring starting from next data point (in time series) after removing the aggregator. The method can include accumulating the time series metrics data for the one or more of the plurality of performance metrics assigned to the removed aggregator received at the removed aggregator before removing the aggregator to obtain an accumulated value for the removed aggregator; and accumulating the time series metrics data for the one or more of the plurality of performance metrics assigned to the removed aggregator received at the next aggregator after removing the aggregator to obtain an accumulated value for the next aggregator. The method can include writing, to a database, the accumulated value for the removed aggregator obtained from the time series metrics data received at the removed aggregator before removing the aggregator; and writing, to the database, the accumulated value for the next aggregator obtained from the time series metrics data received at the next aggregator after removing the aggregator. The method can include merging the two accumulated values to perform a time roll up for a time period. The redistributing can include forwarding the received time series metrics data for the one or more of the plurality of performance metrics assigned to one of the plurality of aggregator to the newly added aggregator in the consistent hash ring starting from next data point after adding the new aggregator. The method can include accumulating the time series metrics data for the one or more of the plurality of performance metrics assigned to one of the aggregators received at the one of the aggregators before adding the new aggregator to obtain an accumulated value for the one or the aggregators; and accumulating the time series metrics data for the one or more of the plurality of performance metrics assigned to the one of the aggregators received at the newly added aggregator after adding the aggregator to obtain an accumulated value for the new aggregator. The method can include writing, to a database, the accumulated value for the one of the aggregators obtained from the time series metrics data received at the one of the aggregators before adding the aggregator; and writing, to the database, the accumulated value for the newly added aggregator obtained from the time series metrics data received at the newly added aggregator after adding the newly added aggregator. The method can include merging the two accumulated values to perform a time roll up for a time period.

In yet another aspect, a non-transitory computer readable medium embodying instructions is disclosed. When the instructions are executed by a processor, the instructions can cause operations to be performed including: receiving, at a plurality of collectors, time series metrics data for a plurality of performance metrics from one or more agents instrumented into monitored applications; aggregating, at a plurality of aggregators communicatively connected to the collectors to form a consistent hash ring, the received time series metrics data for the plurality of performance metrics, wherein each aggregator is assigned to aggregate all received time series metrics data for one or more of the plurality of performance metrics; determining, at a coordinator communicatively connected to the plurality of collectors and the plurality of aggregators, whether one of the plurality of the aggregators in the hash ring has crashed; and performing a repair job to fix data corruption caused by the crashed aggregator.

The non-transitory computer readable medium can be implemented to include one or more of the following features. For example, the operations can include redistributing the received time series metrics data for the one or more of the plurality of performance metrics assigned to the crashed aggregator to next aggregator in the hash ring. Performing the repair job can include obtaining the time series metrics data received at the crashed aggregator before the crash; and merging the obtained time series metric data from the crashed aggregator with the time series metrics data redistributed to the next aggregator in the hash ring. The operations can include splitting the time series metrics data received at the crashed aggregator before the crash into smaller time series.

BRIEF DESCRIPTION OF THE DRAWINGS

FIGS. 1A and 1B are a process flow diagrams showing an exemplary technique for distributed metric data time rollup in real-time.

FIGS. 2A and 2B are block diagrams illustrating time rollup of distributed metric data from granular raw data to progressively less granular data.

FIGS. 3A and 3B are block diagrams of tables illustrating exemplary metric key time buckets for rolling up raw data to progressively less granular data.

FIG. 3C is an exemplary metric key.

FIG. 5C is a process flow diagram of the process for fixing or preventing data corruption.

FIG. 5D shows an exemplary column with two cells from two aggregators.

FIG. 6C is a process flow diagram of the process 608 for fixing or preventing data corruption due to the removed aggregator FIG. 6D shows an exemplary column 630 with the two cells.

FIG. 7A is a process flow diagrams of a process for repairing metric data after an aggregator crashes.

FIG. 7B is a block diagram illustrating a crashed aggregator in a hash ring of aggregator nodes.

FIG. 7C is a process flow diagram of a process for performing the repair job.

DETAILED DESCRIPTION

Figure 3A:

Application intelligence platforms disclosed in this patent document enable application performance monitoring and management using metrics driven processes and systems. In the disclosed application intelligence platforms, monitoring of the raw application performance data is performed by highly efficient instrumentation agents that have automatic code injection capability to trace virtually every line of codes in a given application. These agents automatically instrument millions of lines of code across thousands of tiers, in production environments. The agents support a wide variety of languages and frameworks including java, .Net, Node.js, PHP, Ruby etc. In addition, the disclosed application intelligence platforms include browser and mobile agents to collect end user monitoring information from browser or any mobile devices.

The agents collect metrics data indicative of a number of application performance measures and send the collected metrics data periodically to a metric processing engine at a collector. The metric processing engine rolls up or aggregates the metrics in different dimensions and creates multiple views. The created views are extensively used for reporting and rule engine evaluation for health rule policies.

The created views can include at least two types, hierarchical cluster rollup view and time rollup view. In this patent document, the disclosed technology can enable the time rollup views. Time rollups are performed by rolling up and aggregating raw granular (e.g., 1-minute interval) time series data into progressively less granular data. For example, the raw 1-minute time series data can be rolled up into 10-minute buckets (e.g., by averaging the 1-minute interval data every 10 minutes). The rolled up 10-minute buckets can be rolled up into hourly buckets (e.g., by averaging every six 10-minute buckets into each hourly bucket). The rolled up hourly buckets can be rolled up into daily buckets (e.g., by averaging every twenty-four 1-hour buckets into each daily bucket). The rolled up daily buckets can be rolled up into weekly buckets (e.g., by averaging every seven daily buckets into each weekly bucket). The rolled up weekly buckets can be rolled into monthly buckets (e.g., by averaging every 4 weekly buckets into each monthly bucket). The rolled up monthly buckets can be rolled into yearly buckets (e.g., by rolling up every 12 monthly buckets into each yearly bucket). In some implementations, other granularities in the metrics rollup can be used.

The volume of performance metrics monitored and collected by the agents is extremely high resulting in storage resource burdens. For example, the total number of performance metrics collected per minute by an agent from a large application can be in the range of 10 to 20 million data points. Because each performance metric has several performance statistics, everyday system can ingest 2 to 4 TB of data. Storing the high-resolution (e.g., per minute) data for a long time is not practicable and cost prohibitive. One solution to address the storage burden is to expire the highest resolution data after some period. In order to provide access to the performance metrics for a much longer period of time, the high resolution performance metrics are rolled up into lesser resolutions (e.g., hourly, daily, weekly, monthly, yearly). Also, a health rule policy engine can be used to evaluate data based on baseline and start deviation statistics for a longer a period of time. Table 1 below shows an exemplary data retention policy for different resolution of performance metrics.

TABLE 1

Exemplary data retention policy for different resolution of performance data

| Metric Resolution | Retention Period |
|---|---|
| 1 minute | 1 day |
| 10 minutes | 8 days |
| 60 minutes | 1 year |

For data collection rate of one per each minute, each agent can collect 10 performance metrics data points over a period of 10 minutes, and performance metrics 60 data points over a period of 60 minutes. Using the data retention policy of Table 1, the system will continuously rollup the 1-minute resolution metrics to 10-minutes resolution every 10 minutes, and then to 60-minutes resolution every hour. The rollup process is performed for every metric collected by the agents from the application monitored by the agents. End users can access the collected metrics data by using queries that identifies a metric ID and a time range. Depending on the time range requested, different rollup of the collected data may need to be performed. For example, when the time range specified is within 24 hours, the 1-minute resolution data (i.e., the raw collected metrics data) can be returned. When the time range specified is within 8 days the 10-minute resolution data (i.e., 1-minute resolution data rolled up every 10 minutes) can be returned. When the time range specified is beyond 8 days, the 60-minute resolution data (e.g., the 10-minute resolution data rolled up every 60 minutes) can be returned.

The disclosed technology can provide for a scalable metrics processing system that can dynamically scale out based on the load (number of metrics received per min). The disclosed metrics processing system avoids any single point of failure by allowing a node failure to be handled gracefully. The disclosed metrics processing system does not cause any corruption of rolled up metric data. The disclosed metrics processing system is highly available.

The technology disclosed in this patent document provides for dynamic and efficient application intelligence platforms, systems, devices, methods, and computer readable media including non-transitory type that embody instructions for causing a machine including a processor to perform various operations disclosed in this patent document to obtain the desired application intelligence data. Specifically, the disclosed technology provides for distributed consistent hash backed metric time rollup mechanism in real time using read time resolution technique, with built in support for partial service failures, with high availability.

Distributed Consistent Hash Backed Metric Time Rollup Techniques

FIGS. 1A and 1B are process flow diagrams of exemplary technique for performing distributed consistent hash backed metric time rollup in real time using read time resolution. The techniques disclosed in FIGS. 1A and 1B are performed by a metrics processing system as disclosed with respect to FIGS. 4A, 4B, and 4C. As shown in FIG. 1A, the technique 100 for distributed consistent hash backed metric time rollup includes receiving, at one or more collectors, monitored metrics data from one or more agents instrumented into monitored applications at process 102. The monitored metrics data are received in original high resolution (e.g., 1-minute resolution) by the collectors at the backend of the system, for example. The received monitored metrics data in original high resolution (e.g., 1-minute resolution) are at least temporarily stored in a distributed database, such as HBase at process 104. The stored metrics data in original high resolution are sent (e.g., by collectors) to aggregators organized into a consistent hash ring at process 106. The aggregators perform appropriate rollup of the metrics data in original high resolution into different resolutions at process 108. Examples of rolling up metrics data into different resolutions are disclosed with respect to FIGS. 2A and 2B.

All of the aggregators are registered with the coordinator, such as ZooKeeper to identify the aggregators that are available to form a consistent hash ring. As shown in FIG. 1B, the process 106 for sending the stored metrics data in original high resolution to aggregators organized into a consistent hash ring includes obtaining information on the aggregators that are available to form a hash ring at process 110. The has ring is formed by applying a has function to the available aggregators at process 111. The collectors apply the same hash function that is used to create the consistent hash ring on the received time series of metric data at process 112 to return a hash code that will point to a location on the consistent hash ring. The aggregator closest to the hash code on the consistent hash ring will process the metric for all plurality of time. The collectors use this technique to route the incoming time series metric data to the correct aggregator node on the consistent hash ring at process 113. Thus, all time series data for a particular metric are sent to the same aggregator until an aggregator fails. However, each aggregator may process multiple metrics.

FIGS. 2A and 2B are block diagrams illustrating examples 200 and 210 of rolling up collected metrics data into different resolutions. Time rollups are performed by rolling up and aggregating raw granular (e.g., 1-mintute interval) time series data into progressively less granular data. As shown in FIG. 2A, the raw collected data 202 in high resolution (e.g., t-minute resolution) are rolled up to obtain Rollup 1 data 204 by averaging the collected data 202 every X 't-time' interval. Thus, the Rollup 1 data has a resolution that is reduced by 1/X compared to the collected data 202. The Rollup 1 data are rolled up to obtain Rollup 2 data by averaging the Rollup 1 data every Y 'Rollup 1' interval. Thus, the Rollup 1 data has a resolution that is reduced by 1/Y compared to the Rollup 1 data 204 and 1/XY comparted to the collected data 202. The Rollup N data are obtained by rolling up Rollup N−1 data by averaging the Rollup N−1 data every Z 'Rollup N−1' interval. Thus, the Rollup N data has a resolution that is reduced by 1/Z compared to the Rollup N−1 data (not shown) or by 1/XZ compared to the collected data 202. In this manner, each Rollup data of a given resolution is rolled up to the next lower resolution.

FIG. 2B shows an example 210 of the rollup process illustrated in FIG. 2A. As shown in FIG. 2A, the raw 1-minute resolution time series Raw data 212 can be rolled up into 10-minute resolution data buckets (e.g., by averaging the 1-minute interval data every 10 minutes) 214. The rolled up 10-minute resolution buckets can be rolled up into hourly resolution data buckets (e.g., by averaging every six 10-minute buckets into each hourly bucket) 216. The rolled up hourly buckets can be rolled up into daily resolution buckets (e.g., by averaging every twenty-four 1-hour buckets into each daily bucket (not shown). The rolled up daily buckets can be rolled up into weekly resolution data buckets (e.g., by averaging every seven daily buckets into each weekly bucket) (not shown). The rolled up weekly buckets can be rolled into monthly resolution data buckets (e.g., by averaging every 4 weekly buckets into each monthly bucket) (not shown). The rolled up monthly buckets can be rolled into yearly resolution buckets (e.g., by rolling up every 12 monthly buckets into each yearly bucket) 218. In some implementations, other granularities in the metrics rollup can be used.

Distributed Time Rollup Design

The disclosed technology can provide for a metrics processing system that uses a micro services architecture that ingests metrics data in real time and time rolls up in the data stream. The results of the rollup are stored in a distributed database, such as HBase. Storing the results of rollups in HBase provides advantages. For example, HBase enables a sharding strategy to create ordered partitioning of its key ranges. Using the sharding strategy, long time range queries (e.g., over weeks, months, years, etc.) can be implemented and aggregates can be efficiently applied on the results of the long time range queries at a single shard level. All keys are lexicographically sorted and stored in shards called regions by range. The keys can be designed to store several years of metric data in a single shard or region in HBase.

Exemplary HBase Table Design

FIGS. 3A and 3B are diagrams showing exemplary table designs 300 and 310 for HBase. For example, the HBase table 300 can have multiple column families (e.g., 1, 2, . . . , and N)—one column for each data resolution. Each column family has a different TTL configuration matching a corresponding retention period for a different metric resolution. The example table 310 in FIG. 3B has 3 column families 1, 2, and 3. Each column family has a different TTL configuration—(Column Family 1: TTL 24 hours), (Column Family 2: TTL 8 days), and (Column Family 3: TTL 1 year)—matching the retention period for a different metric resolution. For example, in table 310, the 1-minute resolution data can be written into the first column family having retention period 1 day. After rolling up the metrics for 10 min and 60 minutes, the respective rollups can be stored in 2nd and 3rd column families. HBase can use the retention periods of the columns to automatically deletes metrics.

Exemplary HBase Metric Key Design

The metrics data received from the agents is time series data where every metric data point received has a time stamp associated with it. A metric key can be created to be time bucketed, and values can be stored against columns for each minutes. To avoid hot spotting, the metrics ID and the source before the time. In addition, a prefix salt based on the initial size of the HBase cluster can be used and the table can be pre-split at the time of setup. For example, when the metric key time bucket is set up to be 12 hours as shown in FIG. 3B, 720 (i.e., 60 minutes×12 hours) metric data point are received in 12 hours. These metric values can be stored as different column values depending on the resolution assigned for each column. For example, the column names can be set as the metric payload time. In FIG. 3B, the minute resolution level metric values are stored in the first column family. An exemplary metric key can be designed as shown in FIG. 3C to include: [prefix salt] [metric identity][12 hours time since epoch].

The 1-minute resolution metrics data from the first column family are rolled up to 10-minutes resolution metric data and stored in the 2nd column family every 10 minutes. Similarly, the 60-minutes rolled up metric data points are written to the 3rd column family every hour.

Figure 4:
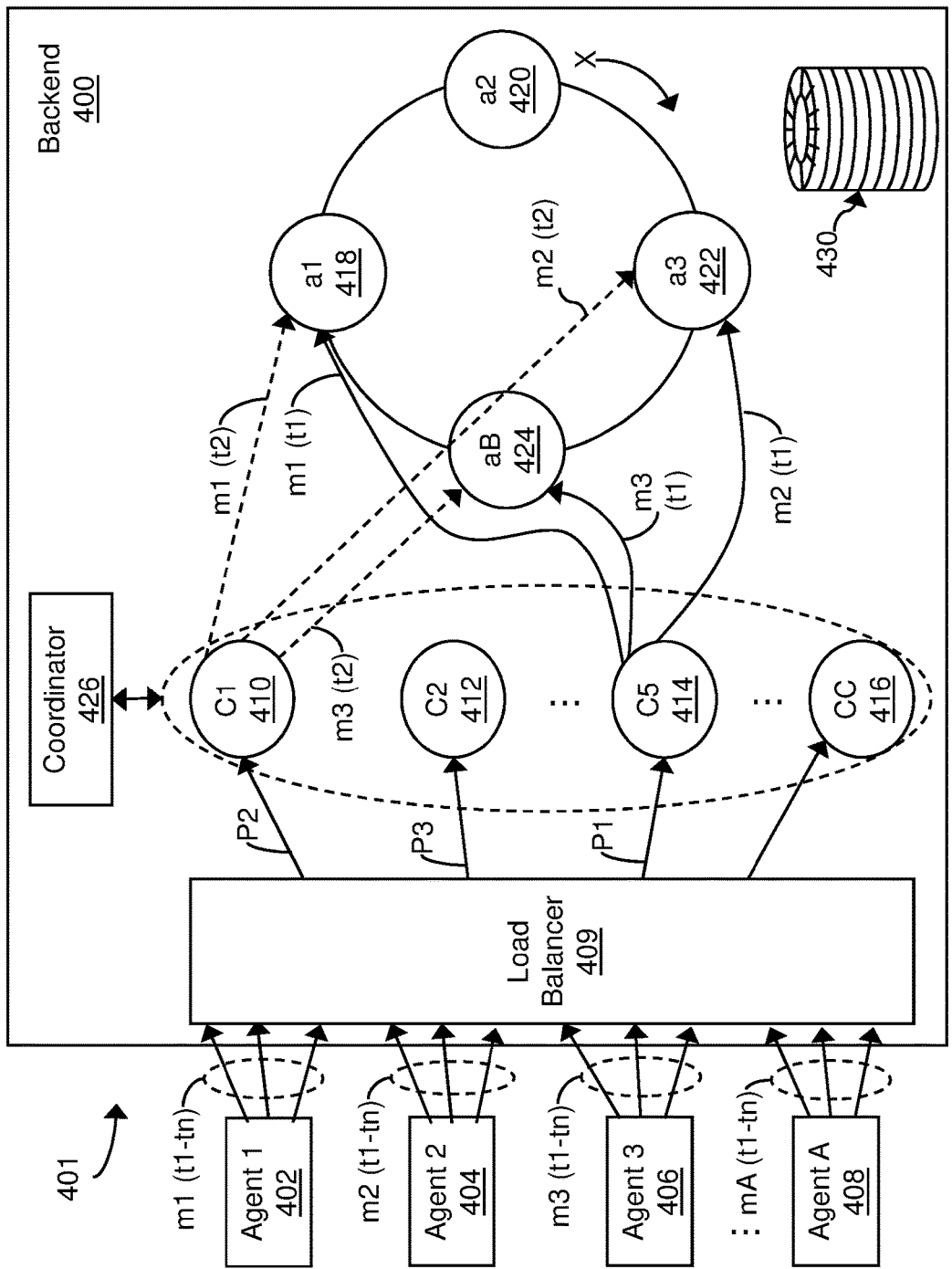
FIG. 4 is a block diagram of an exemplary system for performing distributed metric data time rollup in real-time.

FIG. 4 is a block diagram illustrating a metrics data processing system 400 for rolling up metrics in real-time as disclosed in this patent document. The metrics data processing system 400 can be implemented in an application platform 401. Examples of the application platform are disclosed further with respect to FIGS. 6 and 7 below. The metrics processing system 400 is a backend system that receives metrics data in time series (m1 (t1-tn), m2 (t1-tn), m3 (t1-tn), . . . , mA (t1-tn)) from 'A' total agents 1, 2, 3, . . . , A (402, 404, 406, . . . , 408). The metrics processing system 400 can use Jetty based micro services to rollup the received metrics in real time. The Jetty based micro services in the metric processing system 400 can be organized into two groups—'C' total collectors C1 (410), C2 (412), . . . , C5 (414), . . . CC (416) and 'B' total aggregators a1 (418), a2 (420), a3 (422), and a4 (416). The numbers represented by n, N, A, C, and B can vary based on the deployment of the application intelligence platform 401. Also, n, N, A, C, and B may or may not be the same number.

Collectors 410, 412, 414, and 416 apply the same hash function that is used to create the consistent hash ring on the received metric identities. The hash of the metric identity will return a hash code that will point to a location on the consistent hash ring. The aggregator closest to the hash code on the consistent hash ring will process the metric for all plurality of time. The collectors use this technique to route the incoming metrics to the correct aggregator node on the consistent hash ring.

In some implementations, the collector services 410, 412, 414, and 416 are placed behind an optional load balancer 409 that receives and distributes metric payload data coming from the instrumentation agents 402, 404, 406, and 408. The load balancer 409 can distribute the metric payload data from the agents 402, 404, 406, and 408 across the collectors 410, 412, 414, and 416 based on the load of each collector. When the load balancer 409 is not used at the backend, the agents 402, 404, 406, and 408 can include the load balancing process or alternatively, each agent can be assigned to one or more specific collectors. The collectors 410, 412, 414, and 416 process the incoming metric payload data and persists the received metric payload data into the HBase table in the 1st column family. The metric payload data persisting in the $1^{st}$ column family are 1-minute resolution metrics data. The collectors 410, 412, 414, and 416 send the 1-minute resolution metric data to the aggregator services a1 (418), a2 (420), a3 (422), and aB (424).

The aggregator services 418, 420, 422, and 424 perform time rollup of the 1-minute resolution metrics data and persist them to 2nd and 3rd column families respectively in the HBase table (e.g., HBase Tables 300 and 310) in a database 430. The aggregator services 418, 420, 422, and 424 are organized into a consistent hash ring. Each of the aggregator services 418, 420, 422, and 424 can process a certain range in the hash ring or metric range. Processing a certain range in the hash ring or metric range ensures that any metric received at any collector at any time, will always be forwarded to the same aggregator service for performing the time rollup. For example, a single aggregator service receives all of the ten 1-minute metric data points for a metric, apply aggregate functions on the metric values, and save the aggregated value into HBase in the appropriate column family.

As shown in FIG. 4, each of the collectors 410, 412, 414, and 416 can receive metric data for multiple metrics. However, each of the collectors 410, 412, 414, and 416 may not receive all of the metric data points for a particular metric. This is due to the distribution of the metric payload through the load balancer 409, for example, to provide distributed processing of the large amount of data received from the agents 402, 404, 406, and 408. However, the collectors 410, 412, 414, and 416 can synchronize to forward metric data points for a given metric to the same aggregator 418, 420, 422, and 424.

In the examples system 400 shown in FIG. 4, the collectors [C1, C2 . . . , CC] are placed behind a load balancer 409 and aggregators [a1, a2, a3, . . . aB] are organized into a consistent hash ring. One instrumentation agent (Agent 1 (402)) is sending metric m1 every minute from time t1 till tn, another agent (Agent 2 (404)) is sending metric m2 every minute from time t1 till tn, a third agent (Agent 3 (406)) is sending metric m3 every minute from time t1 till tn, and so on until agent A (Agent A (408)) is sending metric mA every minute from time t1 till tn.

Payload p1 containing metrics m1, m2, and m3 sent at 10:00 am arrived at collector C5 (414). Payload p2 containing metrics m1, m2, and m3 sent at 10:01 am arrived at collector C1 (410). Payload p3 containing metrics m1, m2, and m3 sent at 10:02 am arrived at collector c2. Thus, in this example, for each minute, the payload containing metrics m1, m2, and m3 landed at different collector nodes as shown above. Each collector applies a hash function based on the number of aggregators and routes the metric m1 to aggregator a1 (418), routes the metric m2 to aggregator a3 (422), and routes the metric m3 to aggregator aB (424). After 10 minutes, each of the aggregators a1 (418), a3 (422), and aB (424) can aggregate the 10 metric values for m1, m2, and m3 and write the aggregated values for m1, m2, and m3 to HBase. Similarly, after 60 minutes, aggregators a1 (418), a3 (422), and aB (424) can aggregate the 60 metric values for m1, m2, and m3 and write the aggregated values for m1, m2, and m3 to HBase.

Aggregators 418, 420, 422, and 424 are implemented used to aggregate the metric data for each metric rather than the collectors because collectors are stateless services that are placed behind a load balancer that distributes the load using a round robin rule. Each 1-minute payload for a metric sent from an instrumentation agent may end up being processed at different collectors based on the load balancing performed by the load balancer 409. Time rollups at the collector services for a metric cannot be performed because a single collector process may not have all 10 of the 1-minute level data points, for example. Routing the metric payloads from the collectors to the aggregators based on the hash code for every minute enables the metric processing system 400 to perform time roll up at the aggregator services 418, 420, 422, and 424.

Coordinating Collectors and Aggregators

The collectors 410, 412, 414, and 416 and aggregators 418, 420, 422, and 424 register with the coordinator 426, such as the ZooKeeper based quorum service at the start up. The coordinator 426 monitors the service availability for all of the micro services offered by the collectors 410, 412, 414, and 416 and aggregators 418, 420, 422, and 424. The collectors 410, 412, 414, and 416 retrieve the list of aggregators 418, 420, 422, and 424 at the start up from the coordinator 426. Each collector attaches a watcher to receive notification during an aggregator joining the quorum of the coordinator 426 or leaving the quorum. At any given point in time, all collector service nodes 410, 412, 414, and 416 will retrieve the same set of aggregator nodes 418, 420, 422, and 424 from coordinator 426. The collector nodes 410, 412, 414, and 416 can create a consistent hash ring using the retrieved aggregator nodes.

The coordination mechanism works well when the aggregator nodes 410, 412, 414, and 416 remain constant to allow all metric data points for a metric to be sent to the same aggregator. When the aggregator nodes 410, 412, 414, and 416 change by adding to or subtracting from the hash ring of aggregators, the metric processing system 400 is scalable to dynamically add or subtract aggregators restfully without an interruption.

The makeup of the aggregator nodes can change for various reasons. For example, when the load increases, new aggregator nodes can be added to the ring. When the load decreases, one or more of the nodes can be removed from the ring.

In some implementations, during software upgrades, older aggregators can be removed from the ring and newer aggregators can be added to the ring continuously.

In some implementations, one or more aggregators might crash and new aggregators can be added to the ring to compensate for crashed nodes.

Figure 5B:
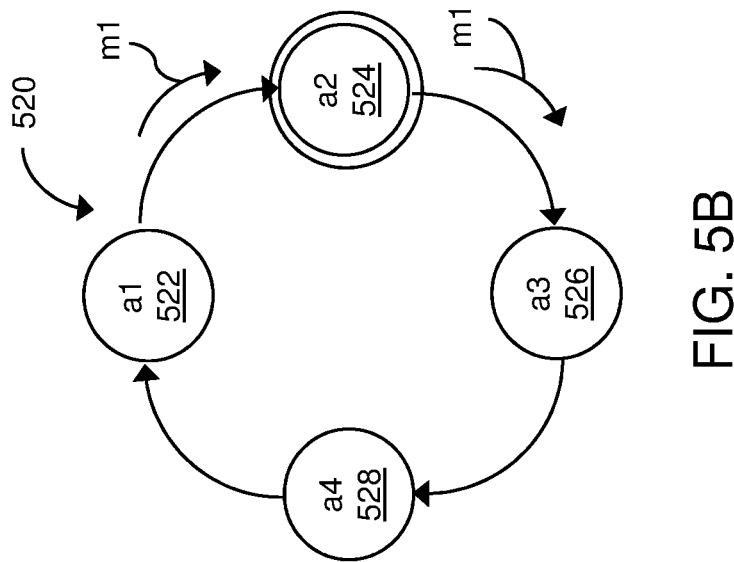
FIG. 5B is a block diagram illustrating an addition of a new aggregator described in process 500 of FIG. 5A.
Figure 5A:
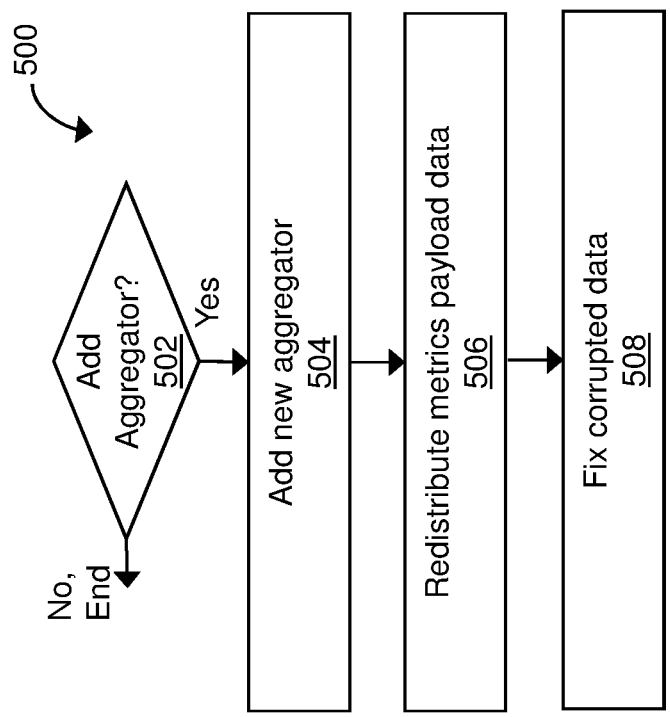
FIG. 5A is a process flow diagram of a process for scaling the nodes of aggregators by adding a new aggregator to the ring.

FIG. 5A is a process flow diagram of a process 500 for scaling the nodes of aggregators by adding a new aggregator to the ring. FIG. 5B is a block diagram illustrating the addition of the new aggregator described in process 500 of FIG. 5A.

In FIG. 5B, 4 aggregator nodes a1 (522), a2 (524), a3 (526), and a4 (528) form a consistent hash ring 520, but aggregator a2 (524) was added to the ring using the process 500 of FIG. 5A. Based on a condition, such as an increase in the load, a determination is made to add a new aggregator at process 502. A new aggregator node a2 (524) is added to the ring at process 504. In the example shown in FIG. 5B, the new aggregator node a2 (524) is added to the ring at 10:15 am. The added aggregator a2 (524) is indicated using a double ring in FIG. 5B. Adding the new aggregator a2 (524) requires redistributing the metric payload data to include the new aggregator a2 (524) at process 506. For example, as shown in FIG. 5B, any metric payload data for m1 arriving at a3 (526) will now go to aggregator a2 (524) after 10:15 am. If, for example, aggregator a3 (526) has received 15 data points for metric m1 before aggregator a2 (524) was added to the ring, aggregator a3 (526) can aggregate 15 minutes of data for the hour rollup and the remaining 45 minutes of metric data points will be rolled up by aggregator a2 (524). If both aggregators a2 (524) and a3 (526) are allowed to write the hour rolled up data into the 3rd column family in HBase with same column name "10:00", one aggregator will over write other corrupting the hour rollup value for 10:00. This is because any change in the aggregator consistent hash ring will create corruption of the time rolled up data due to the splitting of metric payload data into multiple aggregators. The process 500 includes fixing or preventing data corruption at process 508.

FIG. 5C is a process flow diagram of the process 508 for fixing or preventing data corruption. The corrupted data fixing or prevention process 508 includes adding an aggregator suffix to the column name in HBase at process 510 before writing to the next rollup column family (e.g., for hourly roll up) at process 512. Using the aggregator suffix creates two cells (one from each aggregator) for the hour time rollup with different column names. For example, one cell in the column can be named "10:00_a3" to indicate m1 data written by aggregator a3 (526) with 15 metric data points aggregated. The other cell in the column can be named "10:00_a2" to indicate metric data written by aggregator a2 (524) with 45 data points aggregated. FIG. 5D shows an exemplary column 530 with the two cells. The values in the two cells are merged at process 514. For example, a read scan will pick up the values from both cells, and merge the values in real time before returning the results to the client. Using the read time resolution method two or more aggregated cells can be merged during scans.

Figure 6B:
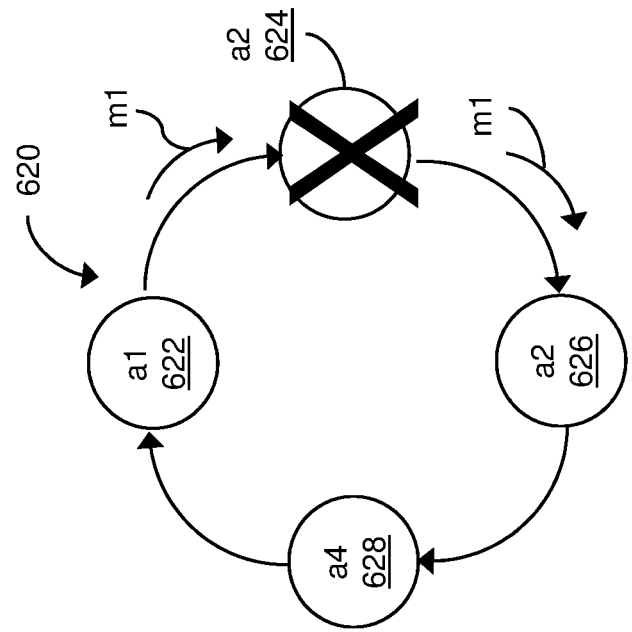
FIG. 6B is a block diagram illustrating the removal of the aggregator described in process 600 of FIG. 6A.
Figure 6A:
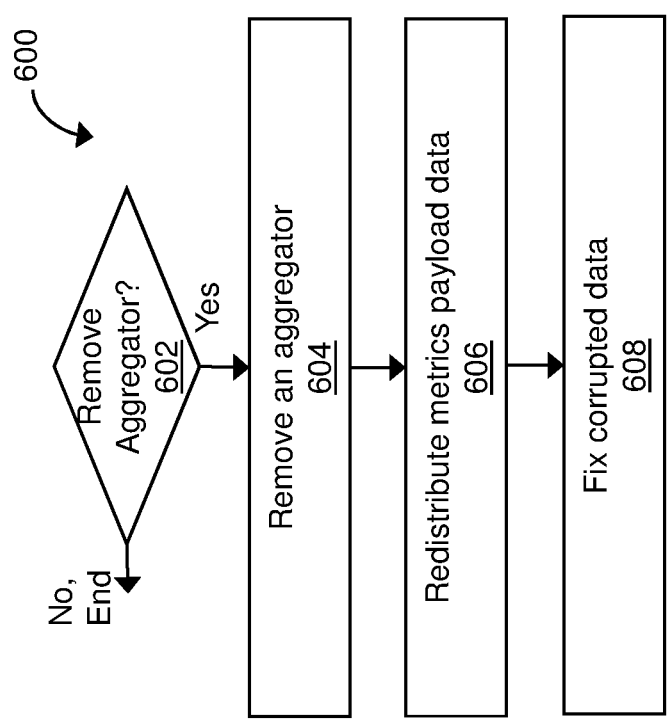
FIG. 6A is a process flow diagram of a process for scaling the nodes of aggregators by removing an aggregator to the ring.

FIG. 6A is a process flow diagram of a process 600 for scaling the nodes of aggregators by removing an aggregator to the ring. FIG. 6B is a block diagram illustrating the removal of the aggregator described in process 600 of FIG. 6A.

In FIG. 6B, 4 aggregator nodes a1 (622), a2 (624), a3 (626), and a4 (628) form a consistent hash ring 620, but aggregator a2 (624) is being removed from to the ring using the process 600 of FIG. 6A. Based on a condition, such as a decrease in the load, a determination is made to remove an aggregator at process 602. The desired aggregator is removed at process 604. Due to the removed aggregator, the metric payload data is redistributed at process 606. Metric values for the next minute after removal of aggregator a2 (624) will route to the next aggregator a3 (626) in the ring.

The next aggregator a3 (626) will aggregate the remaining minutes of the hour and the aggregated values from both aggregators will be written to the HBase. Because the removal of the aggregator corrupts the rolled up data by creating two aggregated values, the process 600 includes fixing the corrupted data at process 608.

FIG. 6C is a process flow diagram of the process 608 for fixing or preventing data corruption due to the removed aggregator. After the node aggregator is removed from the consistent hash ring, the accumulated metric values from removed aggregator and the next aggregator that took over the accumulation are written into the database (e.g., HBase) at process 612 before terminating the process for the removed aggregator at process 614. To prevent or fix data corruption for the two sets of accumulated data, the column names in the database will have the aggregator name as a suffix at process 610 before writing the accumulated metric values to the database at process 612. The aggregator name suffix usage is similar to the approach for adding a new aggregator node to the ring as disclosed with respect to FIG. 5C above.

Using the aggregator suffix creates two cells (one from each aggregator) for the hour time rollup with different column names. FIG. 6D shows an exemplary column 630 with the two cells. The values in the two cells are merged at process 616. For example, a read scan will pick up the values from both cells, and merge the values in real time before returning the results to the client. Using the read time resolution method two or more aggregated cells can be merged during scans.

The disclosed technology also provides for means to repair time rolled up data corruption when an aggregator node crashes. In the event of an aggregator node crash, the crashed aggregator node would not be able to write the accumulated metric values into the database (e.g., HBase). FIG. 7A is a process flow diagram of a process for repairing data after a crash 700. FIG. 7B is a block diagram of an exemplary has ring of accumulators 720 that illustrates an aggregator crash. For example, in the hash ring 720 of FIG. 7B, when aggregator a2 crashes at time 10:25 am, all the metric values for m1 being sent to a2 will be redistributed to aggregator a3 from the next minute (10:26 am). After the crash, aggregator a3 will receive and accumulate metric values from 10:26 am to 10:59 am—total of 35 data points. Aggregator a3 will write the metric data points into HBase for 35 data points. The initial 25 minutes of data for m1 received by accumulator a2 will be lost with the crashed aggregator a2.

Figure 7D:
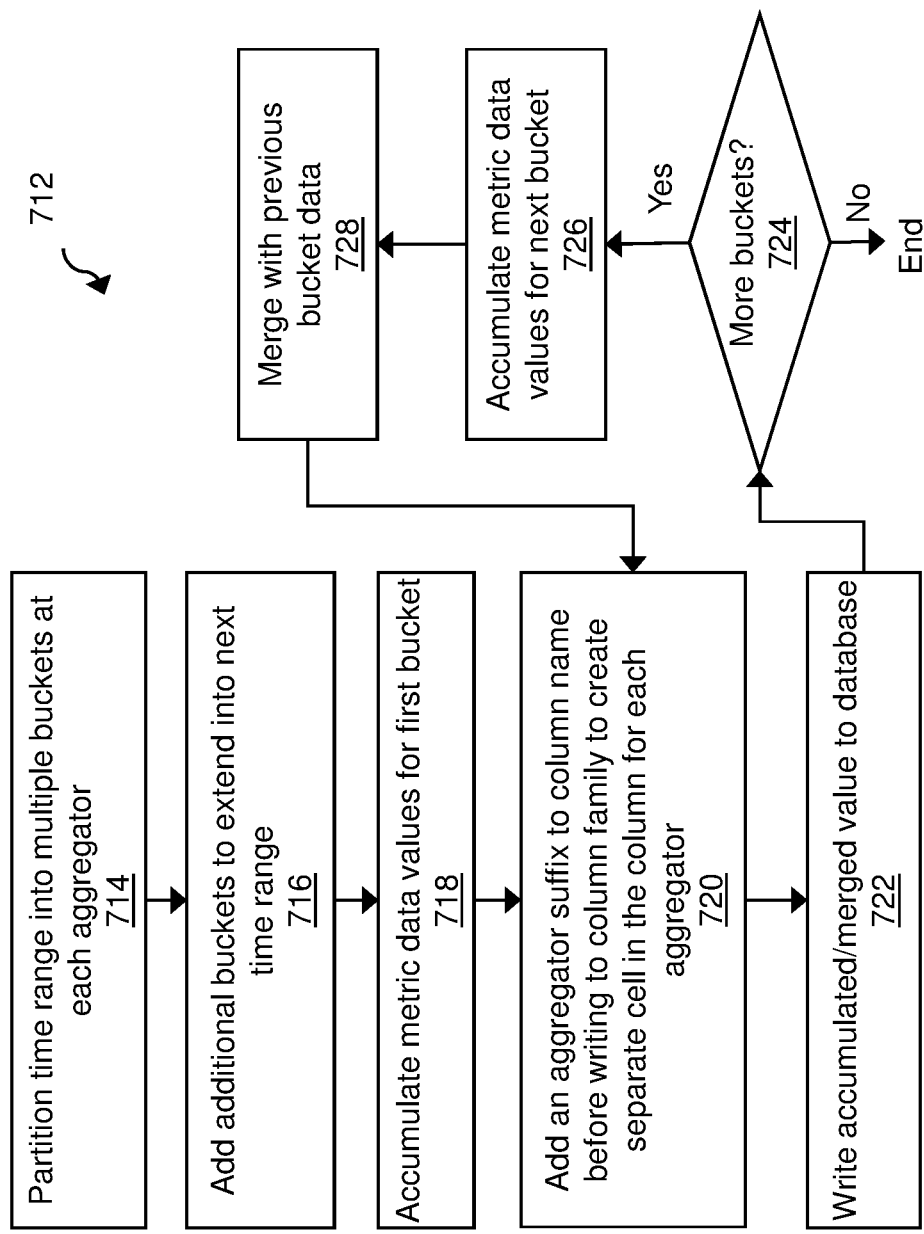
FIG. 7D is a process flow diagram of a process for preparing for the repair job so that the repair job when performed is optimized.
Figure 7F:
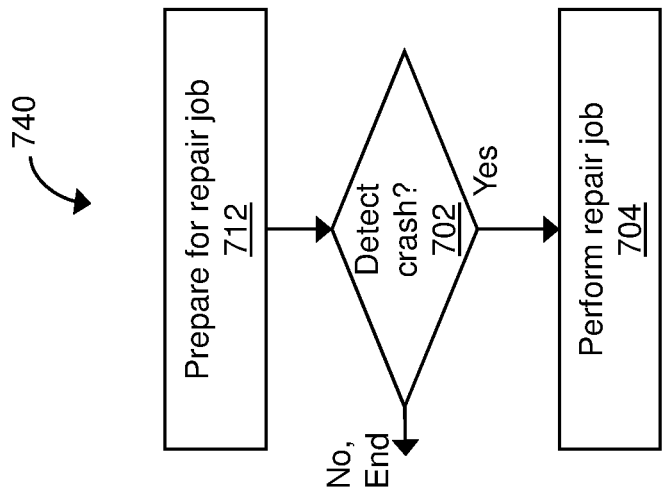
FIG. 7F is a process flow diagram showing an exemplary process for performing a repair job after a crash once the preparation for the repair job has been integrated into the process.
Figure 7E:
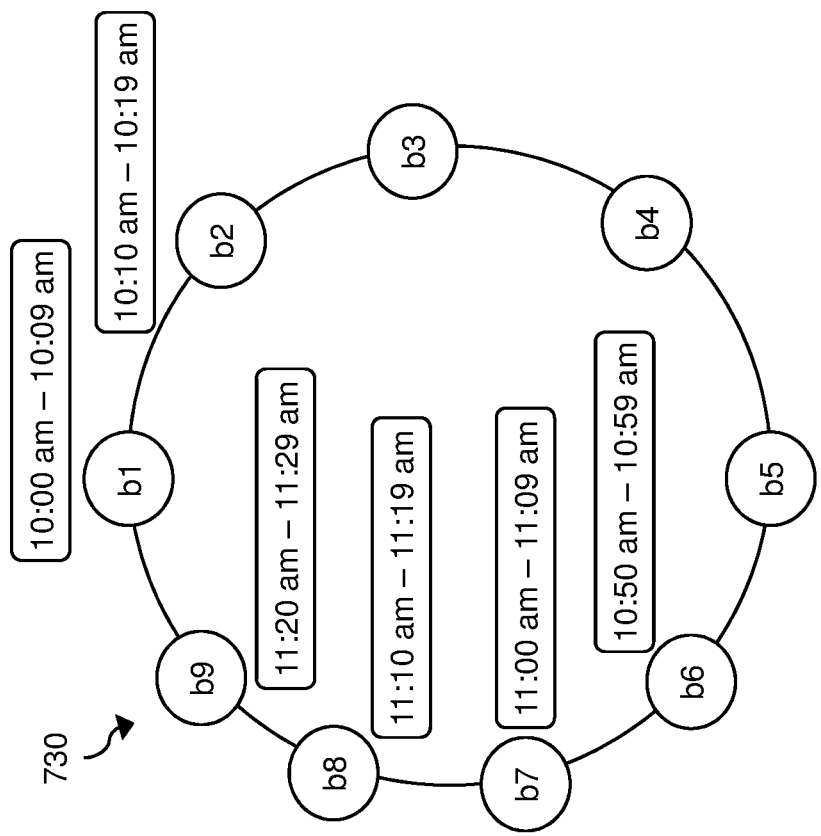
FIG. 7E is a block diagram illustrating buckets created during the repair job preparation process.

FIG. 7C is a process flow diagram of the process 704 for performing the repair job. FIG. 7D is a process flow diagram of a process 712 for preparing for the repair job so that the repair job when performed is optimized. FIG. 7E is a block diagram illustrating buckets 730 created during the repair job preparation process. FIG. 7F is a process flow diagram showing an exemplary process 740 for performing a repair job after a crash once the preparation for the repair job has been integrated into the process.

For the process 700 shown in FIG. 7A, because the aggregators and collectors register themselves with the coordinator quorum service 426 and monitors the availability using watchers, the coordinator 426 can detect a node crash at process 702 and then perform a repair job at process 704. As shown in FIG. 7C, the repair job 704 includes replaying the not yet rolled up payload that arrived at the crashed accumulator a2 before the crash (e.g., from 10:00 am to 10:25 am) at process 706. The data received at the crashed accumulator a2 from 9:50 am to 9:59 should have been rolled up already. The 25 minutes of metric data for those metrics that have been lost with aggregator a2 crash obtained from the replay is sent to aggregator a3 at process 708 to be aggregated. The portion of 25 minutes received from the crashed aggregator is saved into HBase at process 710.

The repair job could be very expensive depending on the time of the crash. For example, when an aggregator crashes at 10:59 am, the repair job has to replay the entire 1-hour of payloads received. The disclosed technology provides for a technique 712 for preparing for the repair job by optimizing the replay process during the repair job as shown in FIG. 7D. To prepare for the repair job at process 712, the time range (e.g., 1-hour time range) is partitioned into multiple buckets (e.g., 6 buckets of 10 minutes each) that breaks up the time range into smaller manageable chunks at each aggregator at process 714. For the above example where aggregator a2 crashed, the first bucket can store metric data from 10:00 am to 10:09 am; the second bucket can store metric data from 10:10 am to 10:19 am; the third bucket can store metric data from 10:20 am to 10:29; the fourth bucket can store metric data from 10:30 am to 10:39 am; the fifth metric data can store metric data from 10:40 am to 10:49 am; and the 6th bucket can store the metric data from 10:50 am to 10:59 am. To have buffer beyond the one-hour time range and into the next hour, additional buckets (e.g., another 3 buckets for 30 minutes of next hour) are added to the list at process 716. The values in each bucket are accumulated at each accumulator and written to the database, such as HBase. Specifically, the metric data values in the $1^{st}$ bucket are accumulated at process 718. An aggregator suffix is used identify the accumulator value at process 720 before writing to the database at process 722. When determined that more buckets are available at process 724, the metric data values in the next bucket are accumulated at process 726 and merged with the accumulated values from the previous bucket at process 728. The same aggregator suffix is used to write the merged value to the database, such as HBase at processes 720 and 722. The merged value overrides the previously stored value in HBase. The values in each of the subsequent buckets are accumulated and merged with previous bucket until all of the buckets are processed.

FIG. 7E shows an exemplary repair process using buckets 730 created during the preparation process. For example, from 10:00 am to 10:09 am, the aggregator accumulates all 10 metric data points in the 1st bucket b1. At 10:10 am, the aggregator writes to HBase the first 10 data point aggregated value from the $1^{st}$ bucket b1 with an aggregator suffix added to the column name. From 10:10 am to 10:19 am, the aggregator can accumulate all 10 metric data points in the 2nd bucket b2. At 10:20 am, the aggregator can merge the metric values from the $1^{st}$ and second buckets b1 and b2 and write to HBase overwriting the first value written after 10 minutes. After every 10-minute window, the metric values accumulated in the current bucket are merged with all the previous buckets and then written to HBase overwriting the previous value. The same aggregator suffix, e.g. 10:00_a2, is used as the column name. The accumulating, merging and writing the metric values from each bucket continues until all buckets for the entire time range (e.g., 1 hour in this crash example) have been processed.

The added buckets b7, b8, and b9 are used to store the next Hours accumulated metric values. After 11:30 am (the end of the added buckets in this example), new metric values can be written to bucket 1, and so on to repeat the process. After processing the 9 buckets, 1 hour 30 minutes of aggregated data are stored in the aggregator memory.

FIG. 7F is a process flow diagram of a process 740 for repairing data after an aggregator crashes and once the preparation process 712 has been performed to partition the time range. Due to the preparation process, when aggregator a2 crashes (702) at 10:25 am, the only bucket that could be corrupted would be the 3rd bucket b3. The crashed aggregator a2 would have already written the rolled up data till 10:20 am in column "10:00_a2" using the aggregator suffix. After aggregator a2 crashes, from 10:25 am forward, all metric data values are sent to aggregator a3 till 10:59 am, the next roll up time. At aggregator a3, buckets 4, 5 and 6 would have correct aggregated metric values. The third bucket b3 will have only 5 data points and that will be incorrect.

Thanks to the preparation process 712 of partitioning the time range, the repair job 704 can be performed for only a 10-minute time range 10:20 am to 10:29 am. Thus, the data is replayed for only the 10 minutes in the event of an aggregator node crash. The accumulated buckets in aggregator a3 can be written to HBase with column name having suffix a3, e.g. "10:00_a2". In some implementations, the number of data points in each bucket can vary depending on the time range to be partitioned and the number of buckets created. The read scans can merge both cells (from both aggregators) in real time and send the results to the client program. The read time resolution method is same as described above for FIGS. 5C and 6C.

Exemplary Advantages

The disclosed technology for performing distributed time rollups of metrics data in real-time enables the movement of the rollup processing from away from the database, such as HBase to the new micro services including the aggregators. Performing the rollup processing in the aggregators can free up computing requirements in the HBase system, which can lead to removal of computing power from the HBase system. Because database nodes with computing power is more expensive, the metric processing costs can be reduced significantly.

Application Intelligence Platform Architecture

Figure 8:
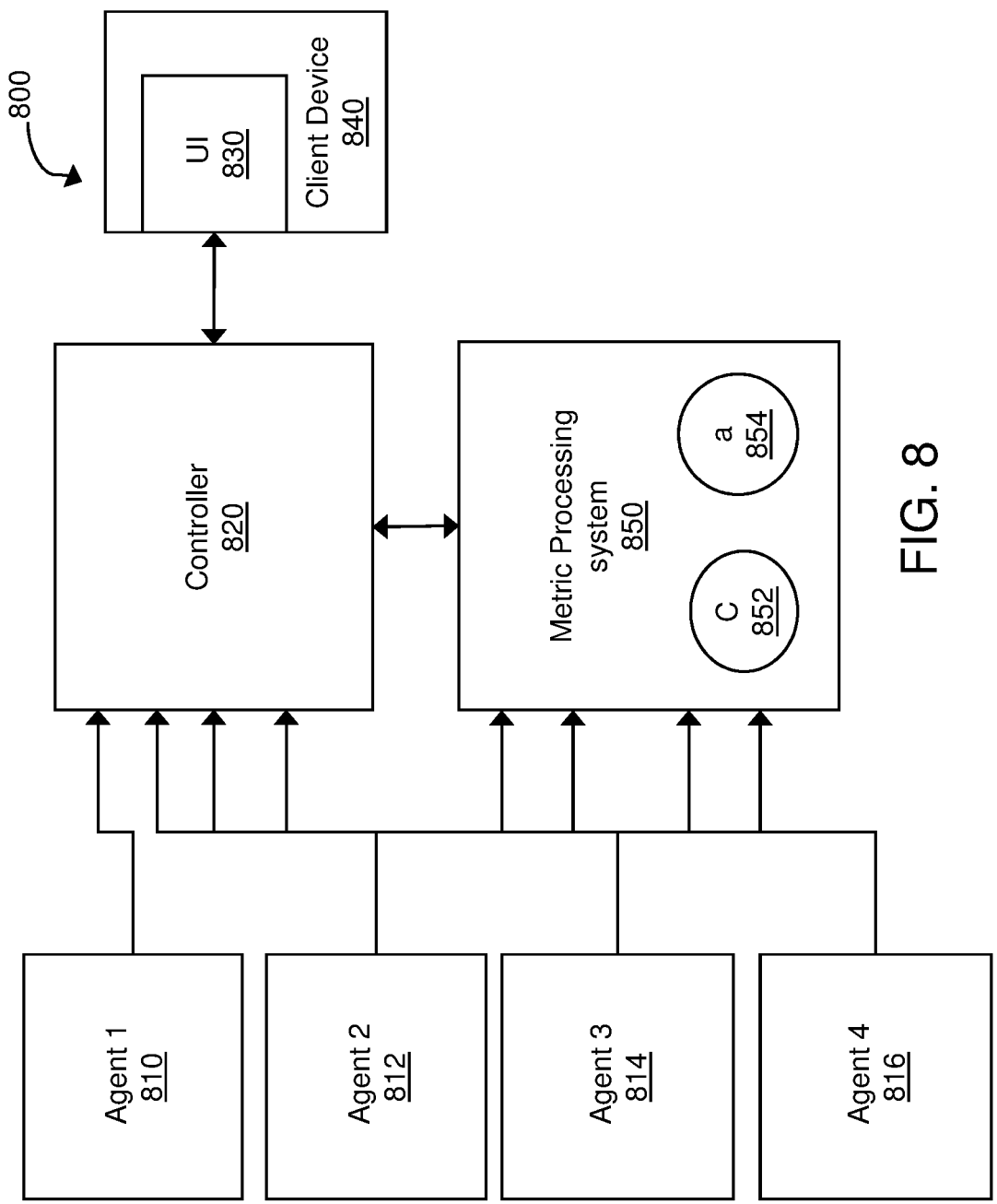
FIG. 8 is a block diagram of an exemplary application intelligence platform that can implement the distributed metric data time rollup in real-time using the disclosed technology, including the processes disclosed with respect to FIGS. 1A through 1D.

The disclosed technology for distributed metric data time rollup in real-time can be implemented in a metric processing system in communication with the agents and controllers of an application intelligence platform. As shown in FIG. 4, the metric processing system can include collectors and aggregators behind a load balance. FIG. 8 is a block diagram of an exemplary application intelligence platform 800 that can implement the distributed metric data time rollup in real-time as disclosed in this patent document. The application intelligence platform is a system that monitors and collect metrics of performance data for an application environment being monitored. At the simplest structure, the application intelligence platform includes one or more agents 810, 812, 814, 816 and one or more controllers 820. While FIG. 8 shows four agents communicatively linked to a single controller, the total number of agents and controller can vary based on a number of factors including the number of applications monitored, how distributed the application environment is, the level of monitoring desired, the level of user experience desired, etc.

Controllers, Agents, and Metric Processing System

The controller 820 is the central processing and administration server for the application intelligence platform. The controller 820 serves a browser-based user interface (UI) 830 that is the primary interface for monitoring, analyzing, and troubleshooting the monitored environment. The controller 820 can control and manage monitoring of business transactions distributed over application servers. Specifically, the controller 820 can receive runtime data from agents 810, 812, 814, 816 and coordinators, associate portions of business transaction data, communicate with agents to configure collection of runtime data, and provide performance data and reporting through the interface 830. The interface 830 may be viewed as a web-based interface viewable by a client device 840. In some implementations, a client device 840 can directly communicate with controller 820 to view an interface for monitoring data. The controller can communicate with the multiple agents return the appropriate pre-fetch application performance data responsive to the request for the pre-fetch application performance data. In some implementations, an application may touch more than one machine and thus application performance data from multiple agents can be combined together by the controller.

In the Software as as Service (SaaS) implementation, a controller instance 820 is hosted remotely by a provider of the application intelligence platform 800. In the on-premise (On-Prem) implementation, a controller instance 820 is installed locally and self-administered.

The controllers 820 receive data from different agents 810, 812, 814, 816 deployed to monitor applications, databases and database servers, servers, and end user clients for the monitored environment. Any of the agents 810, 812, 814, 816 can be implemented as different types of agents specific monitoring duties. For example, application agents are installed on each server that hosts applications to be monitored. Instrumenting an agent adds an application agent into the runtime process of the application.

Database agents are software (e.g., Java program) installed on a machine that has network access to the monitored databases and the controller. Database agents queries the databases monitored to collect metrics and passes the metrics for display in the metric browser—database monitoring and in the databases pages of the controller UI. Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents are standalone programs (e.g., standalone Java program) that collect hardware-related performance statistics from the servers in the monitored environment. The standalone machine agents can be deployed on machines that host application servers, database servers, messaging servers, Web servers, etc. A standalone machine agent has an extensible architecture.

End user monitoring (EUM) is performed using browser agents and mobile agents to provide performance information from the point of view of the client, such as a web browser or a mobile native application. Browser agents and mobile agents are unlike other monitoring through application agents, database agents, and standalone machine agents that being on the server. Through EUM, web use (e.g., by real users or synthetic agents), mobile use, or any combination can be monitored depending on the monitoring needs.

Browser agents are small files using web-based technologies, such as JavaScript agents injected into each instrumented web page, as close to the top as possible, as the web page is served and collects data. Once the web page has completed loading, the collected data is bundled into a beacon and sent to the EUM cloud for processing and ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent is a small piece of highly performant code that gets added to the source of the mobile application. Mobile RUM provides information on the native iOS or Android mobile application as the end users actually use the mobile application. Mobile RUM provides visibility into the functioning of the mobile application itself and the mobile application's interaction with the network used and any server-side applications the mobile application communicates with.

The application intelligence platform 800 can include a metric processing system 850 that includes controllers 852 and aggregators 854. The metric processing system 850 can be implemented substantially similar to the metric processing system 400 shown in FIG. 4. As disclosed with respect to FIG. 4, the metric processing system 400 and 850 can perform the distributed metric data time rollup in real-time as disclosed in this patent document. The metric processing system 850 can communicate with controller 820 to provide the time rolled up data to the controller when requested. In some implementations, the metric payload data from the agents are received through the controller 820.

Application Intelligence Monitoring

The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling

Entities in the application environment (such as the JBoss service, MQSeries modules, and databases) and the services provided by the entities (such as a login transaction, service or product search, or purchase transaction) are mapped to an application intelligence model. In the application intelligence model, a business transaction represents a particular service provided by the monitored environment. For example, in an e-commerce application, particular real-world services can include user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions

A business transaction representation of the particular service provided by the monitored environment provides a view on performance data in the context of the various tiers that participate in processing a particular request. A business transaction represents the end-to-end processing path used to fulfill a service request in the monitored environment. Thus, a business environment is a type of user-initiated action in the monitored environment defined by an entry point and a processing path across application servers, databases, and potentially many other infrastructure components. Each instance of a business transaction is an execution of that transaction in response to a particular user request. A business transaction can be created by detecting incoming requests at an entry point and tracking the activity associated with request at the originating tier and across distributed components in the application environment. A flow map can be generated for a business transaction that shows the touch points for the business transaction in the application environment.

Performance monitoring can be oriented by business transaction to focus on the performance of the services in the application environment from the perspective of end users. Performance monitoring based on business transaction can provide information on whether a service is available (e.g., users can log in, check out, or view their data), response times for users, and the cause of problems when the problems occur.

Business Applications

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

Nodes

A node in the application intelligence model corresponds to a monitored server or JVM in the application environment. A node is the smallest unit of the modeled environment. In general, a node corresponds to an individual application server, JVM, or CLR on which a monitoring Agent is installed. Each node identifies itself in the application intelligence model. The Agent installed at the node is configured to specify the name of the node, tier, and business application under which the Agent reports data to the Controller.

Tiers

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows between tiers and can be visualized in a flow map using lines between tiers. In addition, the lines indicating the traffic flows between tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

Backend System

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

Baselines and Thresholds

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for your system by detecting slow, very slow, and stalled transactions. Configurable thresholds provide a flexible way to associate the right business context with a slow request to isolate the root cause.

Health Rules, Policies, and Actions

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. This health rule can define a warning condition as the combination of an average response time greater than the default baseline by 2 standard deviations and a load greater than 100 calls per minute. The health rule that tests whether the business transaction error rate is much higher than normal can define a critical condition as the combination of an error rate greater than the default baseline by 3 standard deviations and an error rate greater than 10 errors per minute and a load greater than 50 calls per minute. This health rule can define a warning condition as the combination of an error rate greater than the default baseline by 2 standard deviations and an error rate greater than 5 errors per minute and a load greater than 50 calls per minute.

Policies can be configured to trigger actions when a health rule is violated or when any event occurs. Triggered actions can include notifications, diagnostic actions, auto-scaling capacity, running remediation scripts.

Metrics

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots

Snapshots provide a detailed picture of a given application point in time. Snapshots usually include call graphs that allow that enables drilling down to the line of code that may be causing performance problems. The most common snapshots are transaction snapshots.

Exemplary Implementation of Application Intelligence Platform

Figure 9:
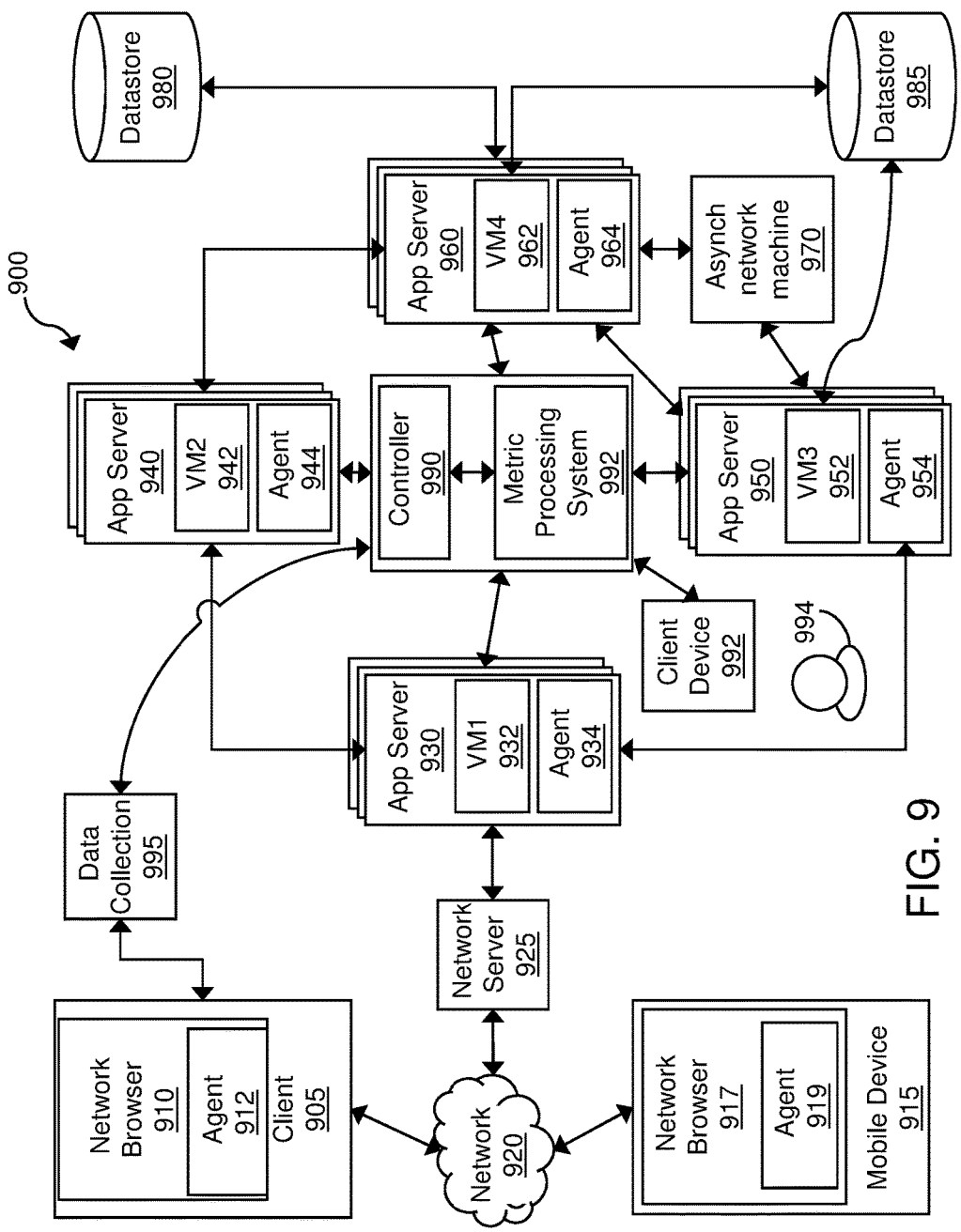
FIG. 9 is a block diagram of an exemplary implementation of the application intelligence platform for distributed metric data time rollup in real-time using the disclosed technology.

FIG. 9 is a block diagram of an exemplary system 900 for distributed metric data time rollup in real-time as disclosed in this patent document, including the techniques disclosed with respect to FIGS. 1A, 1B, 1C, 1D, and 1E. The system 900 in FIG. 9 includes client device 905 and 992, mobile device 915, network 920, network server 925, application servers 930, 940, 950 and 960, agents 912, 919, 934, 944, 954 and 964, asynchronous network machine 970, data stores 980 and 985, controller 990, and data collection server 995.

The system 900 can include a metric processing system 992 that includes controllers and aggregators. The metric processing system 992 can be implemented substantially similar to the metric processing system 400 shown in FIG. 4. As disclosed with respect to FIG. 4, the metric processing system 400, 850, and 992 can perform the distributed metric data time rollup in real-time as disclosed in this patent document. The metric processing system 992 can communicate with controller 990 to provide the time rolled up data to the controller when requested. In some implementations, the metric payload data from the agents are received through the controller 990.

Client device 905 may include network browser 910 and be implemented as a computing device, such as for example a laptop, desktop, workstation, or some other computing device. Network browser 910 may be a client application for viewing content provided by an application server, such as application server 930 via network server 925 over network 920.

Network browser 910 may include agent 912. Agent 912 may be installed on network browser 910 and/or client 905 as a network browser add-on, downloading the application to the server, or in some other manner. Agent 912 may be executed to monitor network browser 910, the operating system of client 905, and any other application, API, or other component of client 905. Agent 912 may determine network browser navigation timing metrics, access browser cookies, monitor code, and transmit data to data collection 960, controller 990, or another device. Agent 912 may perform other operations related to monitoring a request or a network at client 905 as discussed herein.

Mobile device 915 is connected to network 920 and may be implemented as a portable device suitable for sending and receiving content over a network, such as for example a mobile phone, smart phone, tablet computer, or other portable device. Both client device 905 and mobile device 915 may include hardware and/or software configured to access a web service provided by network server 925.

Mobile device 915 may include network browser 917 and an agent 919. Mobile device may also include client applications and other code that may be monitored by agent 919. Agent 919 may reside in and/or communicate with network browser 917, as well as communicate with other applications, an operating system, APIs and other hardware and software on mobile device 915. Agent 919 may have similar functionality as that described herein for agent 912 on client 905, and may repot data to data collection server 960 and/or controller 990.

Network 920 may facilitate communication of data between different servers, devices and machines of system 900 (some connections shown with lines to network 920, some not shown). The network may be implemented as a private network, public network, intranet, the Internet, a cellular network, Wi-Fi network, VoIP network, or a combination of one or more of these networks. The network 920 may include one or more machines such as load balance machines and other machines.

Network server 925 is connected to network 920 and may receive and process requests received over network 920. Network server 925 may be implemented as one or more servers implementing a network service, and may be implemented on the same machine as application server 930 or one or more separate machines. When network 920 is the Internet, network server 925 may be implemented as a web server.

Application server 930 communicates with network server 925, application servers 940 and 950, and controller 990. Application server 930 may also communicate with other machines and devices (not illustrated in FIG. 9). Application server 930 may host an application or portions of a distributed application. The host application 932 may be in one of many platforms, such as including a Java, PHP, .Net, and Node.JS, be implemented as a Java virtual machine, or include some other host type. Application server 930 may also include one or more agents 934 (i.e. "modules"), including a language agent, machine agent, and network agent, and other software modules. Application server 930 may be implemented as one server or multiple servers as illustrated in FIG. 9.

Application 932 and other software on application server 930 may be instrumented using byte code insertion, or byte code instrumentation (BCI), to modify the object code of the application or other software. The instrumented object code may include code used to detect calls received by application 932, calls sent by application 932, and communicate with agent 934 during execution of the application. BCI may also be used to monitor one or more sockets of the application and/or application server in order to monitor the socket and capture packets coming over the socket.

In some embodiments, server 930 may include applications and/or code other than a virtual machine. For example, servers 930, 940, 950, and 960 may each include Java code, .Net code, PHP code, Ruby code, C code, C++ or other binary code to implement applications and process requests received from a remote source. References to a virtual machine with respect to an application server are intended to be for exemplary purposes only.

Agents 934 on application server 930 may be installed, downloaded, embedded, or otherwise provided on application server 930. For example, agents 934 may be provided in server 930 by instrumentation of object code, downloading the agents to the server, or in some other manner. Agent 934 may be executed to monitor application server 930, monitor code running in a virtual machine 932 (or other program language, such as a PHP, .Net, or C program), machine resources, network layer data, and communicate with byte instrumented code on application server 930 and one or more applications on application server 930.

Each of agents 934, 944, 954 and 964 may include one or more agents, such as language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 934 may detect operations such as receiving calls and sending requests by application server 930, resource usage, and incoming packets. Agent 934 may receive data, process the data, for example by aggregating data into metrics, and transmit the data and/or metrics to controller 990. Agent 934 may perform other operations related to monitoring applications and application server 930 as discussed herein. For example, agent 934 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 990 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 934 may create a request identifier for a request received by server 930 (for example, a request received by a client 905 or 915 associated with a user or another source). The request identifier may be sent to client 905 or mobile device 915, whichever device sent the request. In embodiments, the request identifier may be created when a data is collected and analyzed for a particular business transaction.

Each of application servers 940, 950 and 960 may include an application and agents. Each application may run on the corresponding application server. Each of applications 942, 952 and 962 on application servers 940-960 may operate similarly to application 932 and perform at least a portion of a distributed business transaction. Agents 944, 954 and 964 may monitor applications 942-962, collect and process data at runtime, and communicate with controller 990. The applications 932, 942, 952 and 962 may communicate with each other as part of performing a distributed transaction. In particular, each application may call any application or method of another virtual machine.

Asynchronous network machine 970 may engage in asynchronous communications with one or more application servers, such as application server 950 and 960. For example, application server 150 may transmit several calls or messages to an asynchronous network machine. Rather than communicate back to application server 950, the asynchronous network machine may process the messages and eventually provide a response, such as a processed message, to application server 960. Because there is no return message from the asynchronous network machine to application server 950, the communications between them are asynchronous.

Data stores 980 and 985 may each be accessed by application servers such as application server 950. Data store 985 may also be accessed by application server 950. Each of data stores 980 and 985 may store data, process data, and return queries received from an application server. Each of data stores 980 and 985 may or may not include an agent.

Controller 990 may control and manage monitoring of business transactions distributed over application servers 930-960. In some embodiments, controller 990 may receive application data, including data associated with monitoring client requests at client 905 and mobile device 915, from data collection server 960. In some embodiments, controller 990 may receive application monitoring data and network data from each of agents 912, 919, 934, 944 and 954. Controller 990 may associate portions of business transaction data, communicate with agents to configure collection of data, and provide performance data and reporting through an interface. The interface may be viewed as a web-based interface viewable by client device 992, which may be a mobile device, client device, or any other platform for viewing an interface provided by controller 990. In some embodiments, a client device 992 may directly communicate with controller 990 to view an interface for monitoring data.

Client device 992 may include any computing device, including a mobile device or a client computer such as a desktop, work station or other computing device. Client computer 992 may communicate with controller 990 to create and view a custom interface. In some embodiments, controller 990 provides an interface for creating and viewing the custom interface as a content page, e.g., a web page, which may be provided to and rendered through a network browser application on client device 992.

Applications 932, 942, 952 and 962 may be any of several types of applications. Examples of applications that may implement applications 932-962 include a Java, PHP, .Net, Node.JS, and other applications.

FIG. 4 is a block diagram of a computer system 400 for implementing the present technology. System 400 of FIG. 4 may be implemented in the contexts of the likes of clients 905, 992, mobile device 915, network server 925, servers 930, 940, 950, 960, a synchronous network machine 970 and controller 990.

Figure 10:
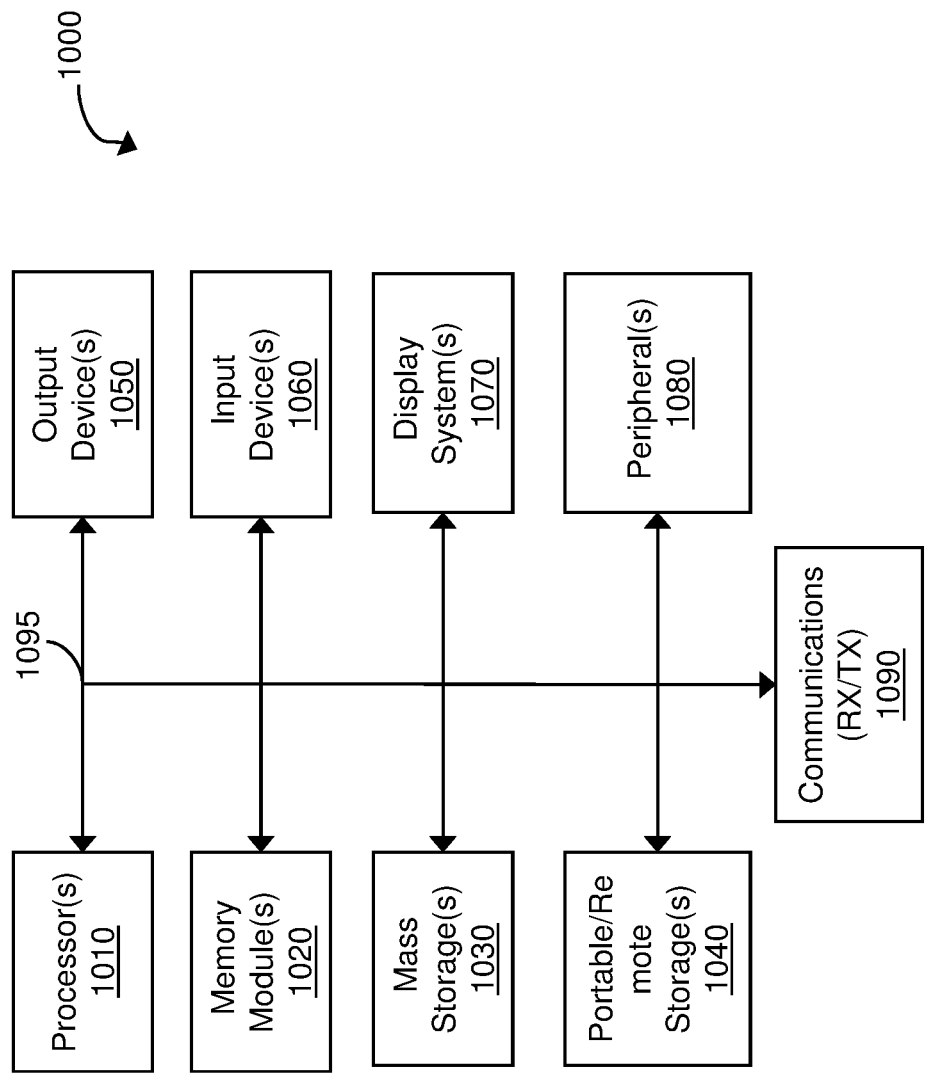
FIG. 10 is a block diagram of an exemplary computing system implementing the disclosed technology.

The computing system 1000 of FIG. 10 includes one or more processors 1010 and memory 1020. Main memory 1020 stores, in part, instructions and data for execution by processor 1010. Main memory 1010 can store the executable code when in operation. The system 1000 of FIG. 10 further includes a mass storage device 1030, portable storage medium drive(s) 1040, output devices 1050, user input devices 1060, a graphics display 1070, and peripheral devices 1080.

The components shown in FIG. 10 are depicted as being connected via a single bus 1090. However, the components may be connected through one or more data transport means. For example, processor unit 1010 and main memory 1020 may be connected via a local microprocessor bus, and the mass storage device 1030, peripheral device(s) 1080, portable or remote storage device 1040, and display system 1070 may be connected via one or more input/output (I/O) buses.

Mass storage device 1030, which may be implemented with a magnetic disk drive or an optical disk drive, is a non-volatile storage device for storing data and instructions for use by processor unit 1010. Mass storage device 1030 can store the system software for implementing embodiments of the present invention for purposes of loading that software into main memory 620.

Portable storage device 1040 operates in conjunction with a portable non-volatile storage medium, such as a compact disk, digital video disk, magnetic disk, flash storage, etc. to input and output data and code to and from the computer system 1000 of FIG. 10. The system software for implementing embodiments of the present invention may be stored on such a portable medium and input to the computer system 1000 via the portable storage device 1040.

Input devices 1060 provide a portion of a user interface. Input devices 1060 may include an alpha-numeric keypad, such as a keyboard, for inputting alpha-numeric and other information, or a pointing device, such as a mouse, a trackball, stylus, or cursor direction keys. Additionally, the system 1000 as shown in FIG. 10 includes output devices 1050. Examples of suitable output devices include speakers, printers, network interfaces, and monitors.

Display system 1070 may include a liquid crystal display (LCD) or other suitable display device. Display system 1070 receives textual and graphical information, and processes the information for output to the display device.

Peripherals 1080 may include any type of computer support device to add additional functionality to the computer system. For example, peripheral device(s) 1080 may include a modem or a router.

The components contained in the computer system 1000 of FIG. 10 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 1000 of FIG. 10 may include one or more antennas, radios, and other circuitry for communicating over wireless signals, such as for example communication using Wi-Fi, cellular, or other wireless signals.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for distributed consistent hash backed time rollup of performance metric data, the system including:
   a plurality of collectors configured to receive, time series metrics data for a plurality of performance metrics from one or more agents instrumented into monitored applications;
   a plurality of aggregators communicatively connected to the collectors and configured to aggregate the received time series metric data for the plurality of performance metrics, wherein each aggregator is assigned to aggregate all received time series metrics data for one or more of the plurality of performance metrics; and
   a coordinator communicatively connected to the plurality of collectors and plurality of aggregators and configured to provide collectors with information on availability of the plurality of aggregators, detect whether one of the plurality of aggregators has been removed from a hash ring, accumulate the time series metrics data for the one or more of the plurality of performance metrics assigned to the removed aggregator received at the removed aggregator before removing the aggregator to obtain an accumulated value for the removed aggregator; and accumulate the time series metrics data for the one or more of the plurality of performance metrics assigned to the removed aggregator received at the next aggregator after removing the aggregator to obtain an accumulated value for the next aggregator.

2. The system of claim 1, wherein the aggregators are arranged in the hash ring using a hash function.

3. The system of claim 2, wherein the hash ring includes a consistent hash ring.

4. The system of claim 3, wherein the coordinator includes a quorum based coordinator service that provides information to the plurality of collectors about the information on all of the aggregators that are available to form the consistent hash ring.

5. The system of claim 3, wherein the plurality of collectors are configured to apply the same hash function used to form the hash ring on the received time series metric data for a given performance metric to generate a hash code that points to a location on the hash ring, wherein one of the aggregators closest to the hash code on the hash ring is assigned to process all of the received time series metric data for the given performance metric.

6. The system of claim 5, wherein the plurality of collectors are configured to use the hash code to route the received time series metric data for each performance metric to corresponding aggregator node on the consistent hash ring.

7. The system of claim 2, wherein the coordinator is configured to detect whether a new aggregator has been added to the hash ring.

8. The system of claim 1, wherein each aggregator is configured to perform time roll up of the received time series metric data for the assigned one or more performance metric.

9. The method of claim 8, including:
   redistributing, by the collectors, the received time series metrics data based on the information.

10. The method of claim 9, wherein the redistributing includes:
    forwarding the received time series metrics data for the one or more of the plurality of performance metrics assigned to the removed aggregator to next aggregator in the hash ring starting from next data point after removing the aggregator.

11. The method of claim 10, including:
    accumulating the time series metrics data for the one or more of the plurality of performance metrics assigned to one of the aggregators received at the one of the aggregators before adding a new aggregator; and
    accumulating the time series metrics data for the one or more of the plurality of performance metrics assigned to the one of the aggregators received at the new aggregator after adding the new aggregator to obtain an accumulated value for the new aggregator.

12. The method of claim 9, wherein the redistributing includes:
    forwarding the received time series metrics data for the one or more of the plurality of performance metrics assigned to one of the plurality of aggregator to a newly added aggregator in the hash ring starting from next data point after adding a new aggregator.

13. The system of claim 1, wherein each aggregator can receive the time series metrics data for the assigned one or more of the plurality of performance metrics from two or more of the plurality of collectors.

14. The method of claim 1, wherein the information indicates that one of the plurality of aggregators has been removed or a new aggregator has been added.

15. The method of claim 14, including:
    merging the accumulated value for the removed aggregator and the accumulated value for the next aggregator to perform a time roll up for a time period.

* * * * *

UNITED STATES PATENT AND TRADEMARK OFFICE
CERTIFICATE OF CORRECTION

PATENT NO. : 10,187,249 B2
APPLICATION NO. : 15/143112
DATED : January 22, 2019
INVENTOR(S) : Gautam Borah et al.

It is certified that error appears in the above-identified patent and that said Letters Patent is hereby corrected as shown below:

In the Specification

In Column 19, Line 45, please amend as shown:
tion at a certain point in time. Snapshots usually include call graphs that Signed and Sealed this
Fourth Day of February, 2020

Andrei Iancu
*Director of the United States Patent and Trademark Office*